Sept. 9, 1941. W. W. LANDSIEDEL 2,255,622
COMPUTING MACHINE
Filed Feb. 15, 1937 16 Sheets-Sheet 1

INVENTOR
WALTER.W.LANDSIEDEL
BY
*W. A. Sparkes.*
HIS ATTORNEY

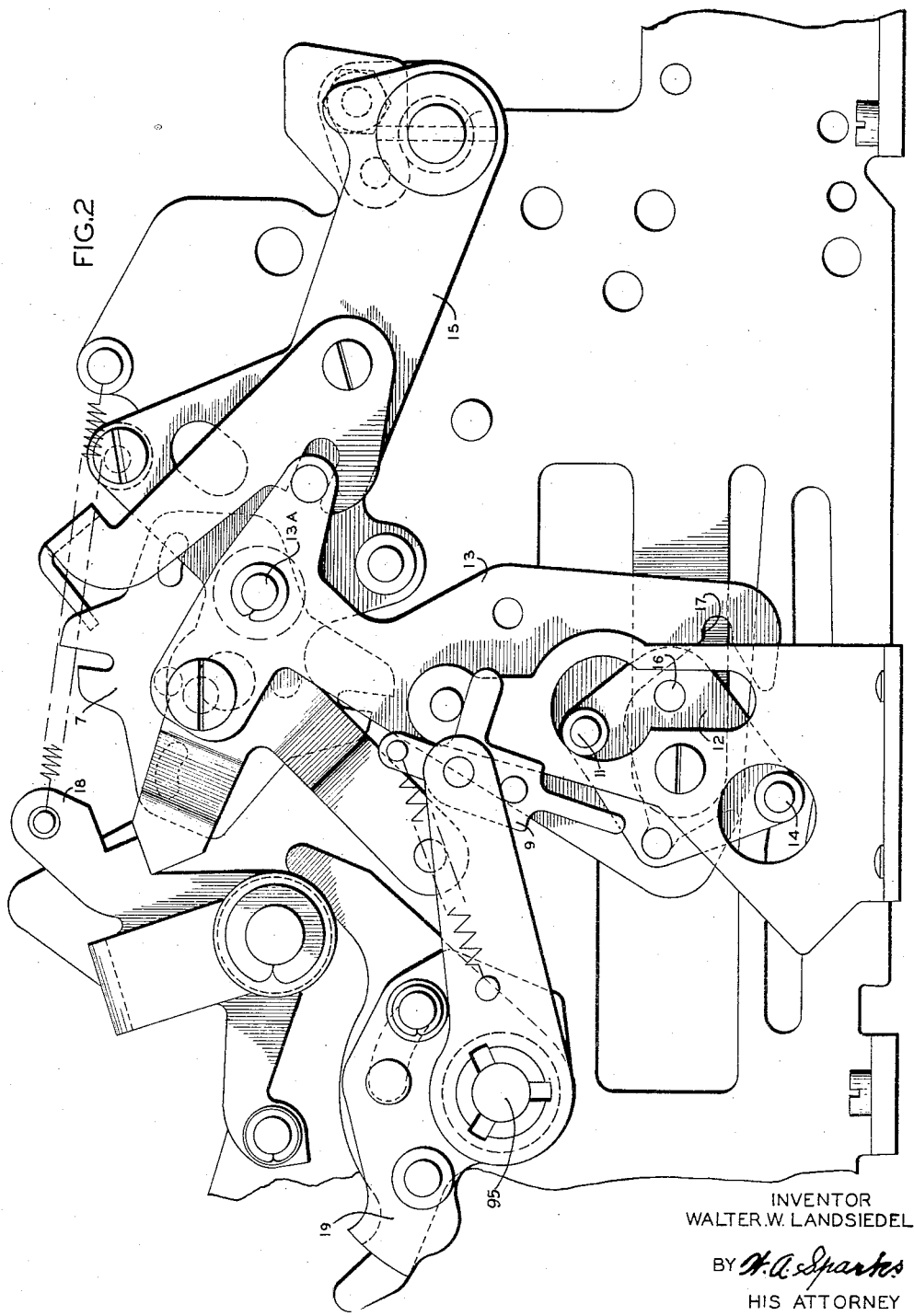

Sept. 9, 1941.  W. W. LANDSIEDEL  2,255,622
COMPUTING MACHINE
Filed Feb. 15, 1937  16 Sheets-Sheet 3
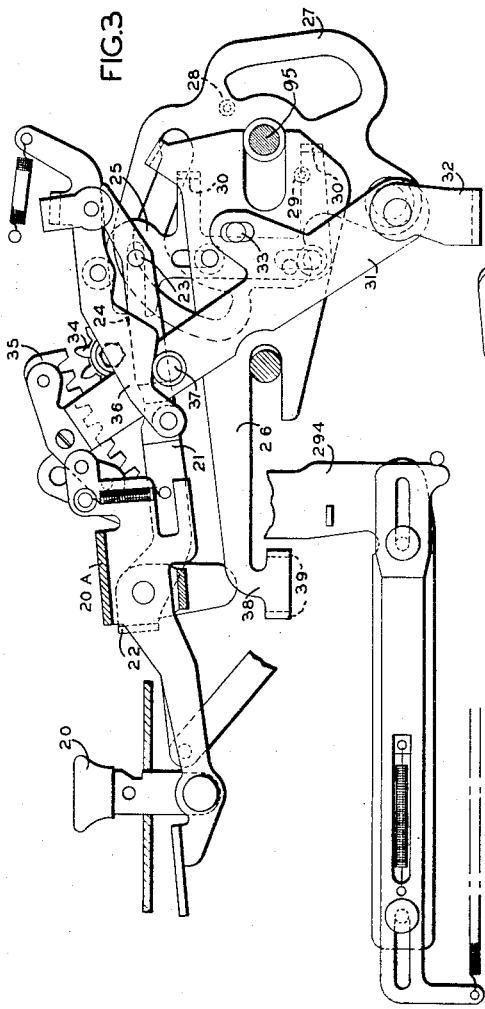
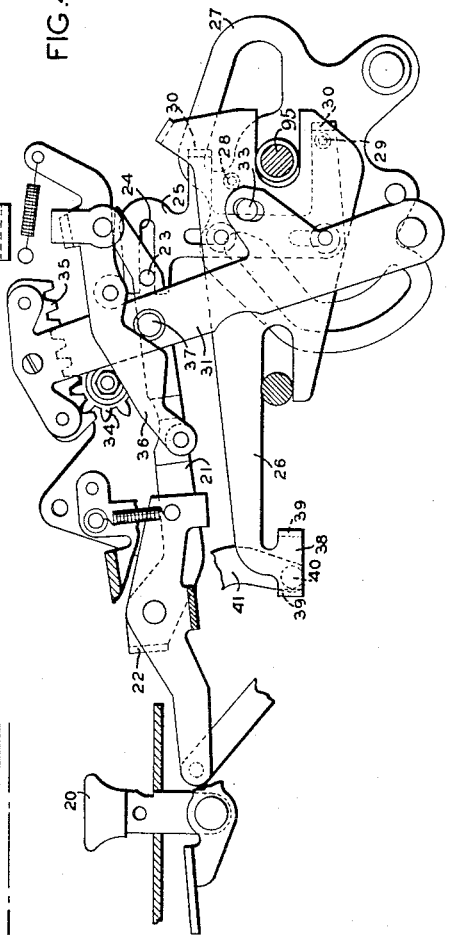
INVENTOR
WALTER W. LANDSIEDEL
BY
*H. A. Sparks*
HIS ATTORNEY

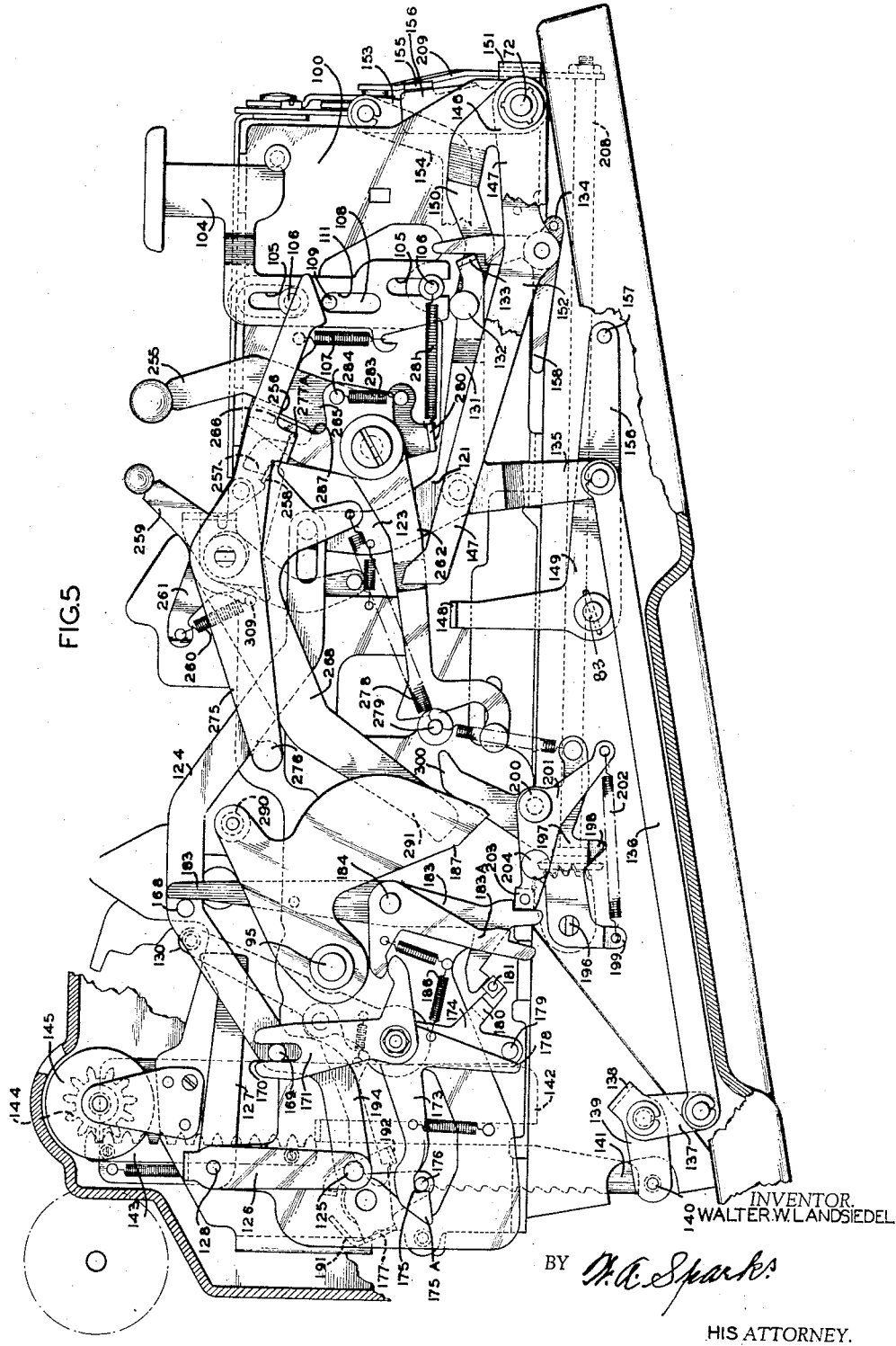

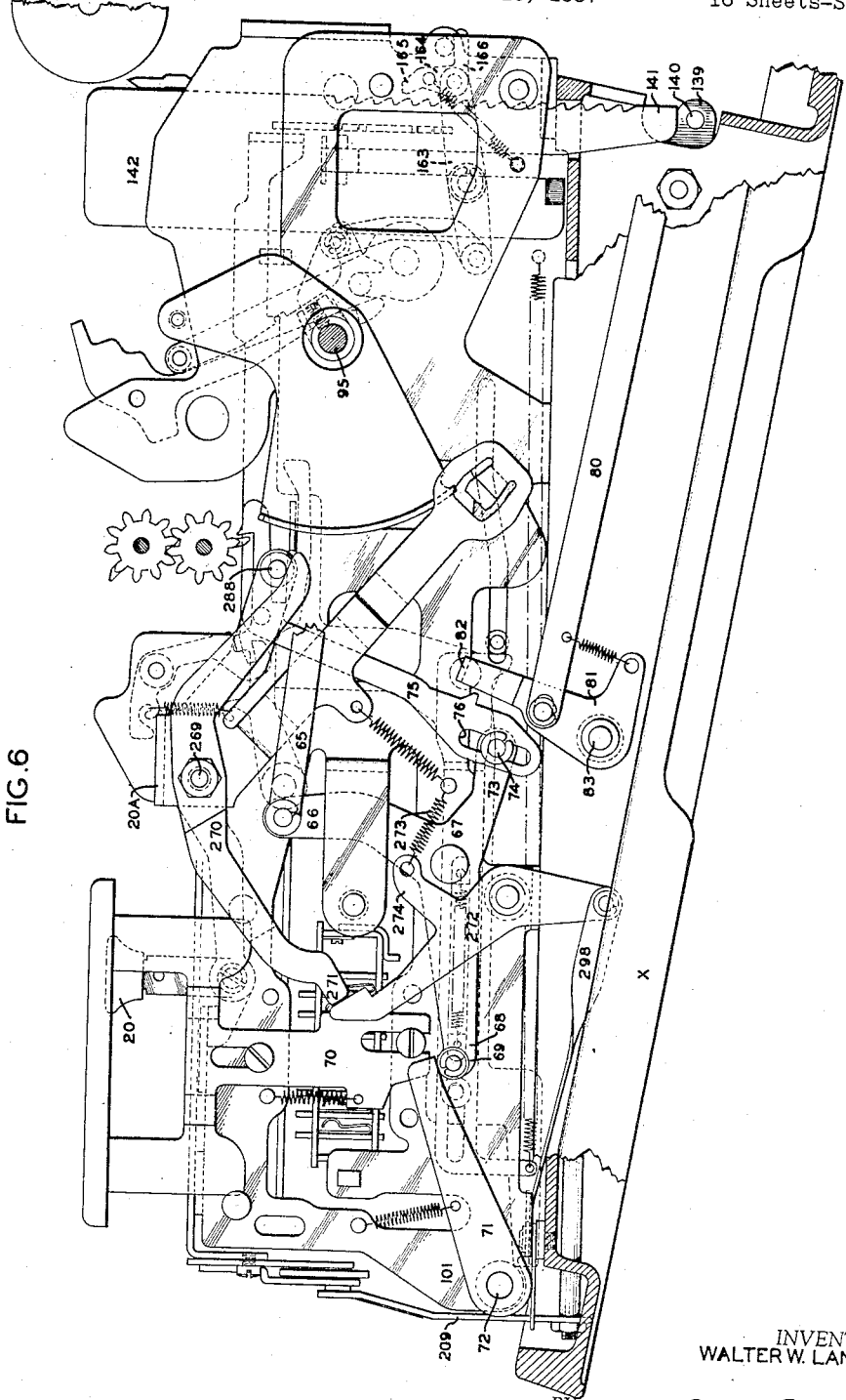

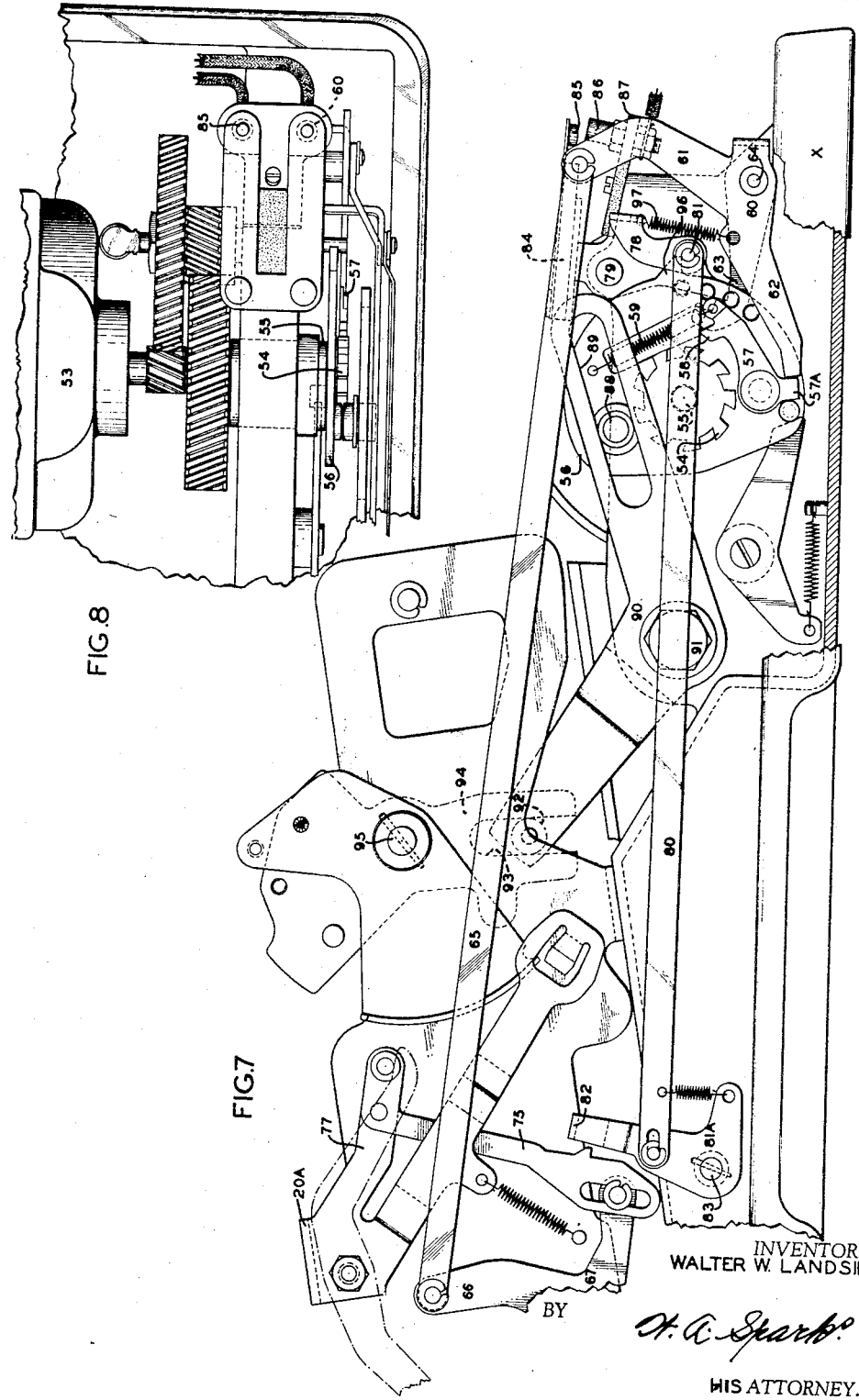

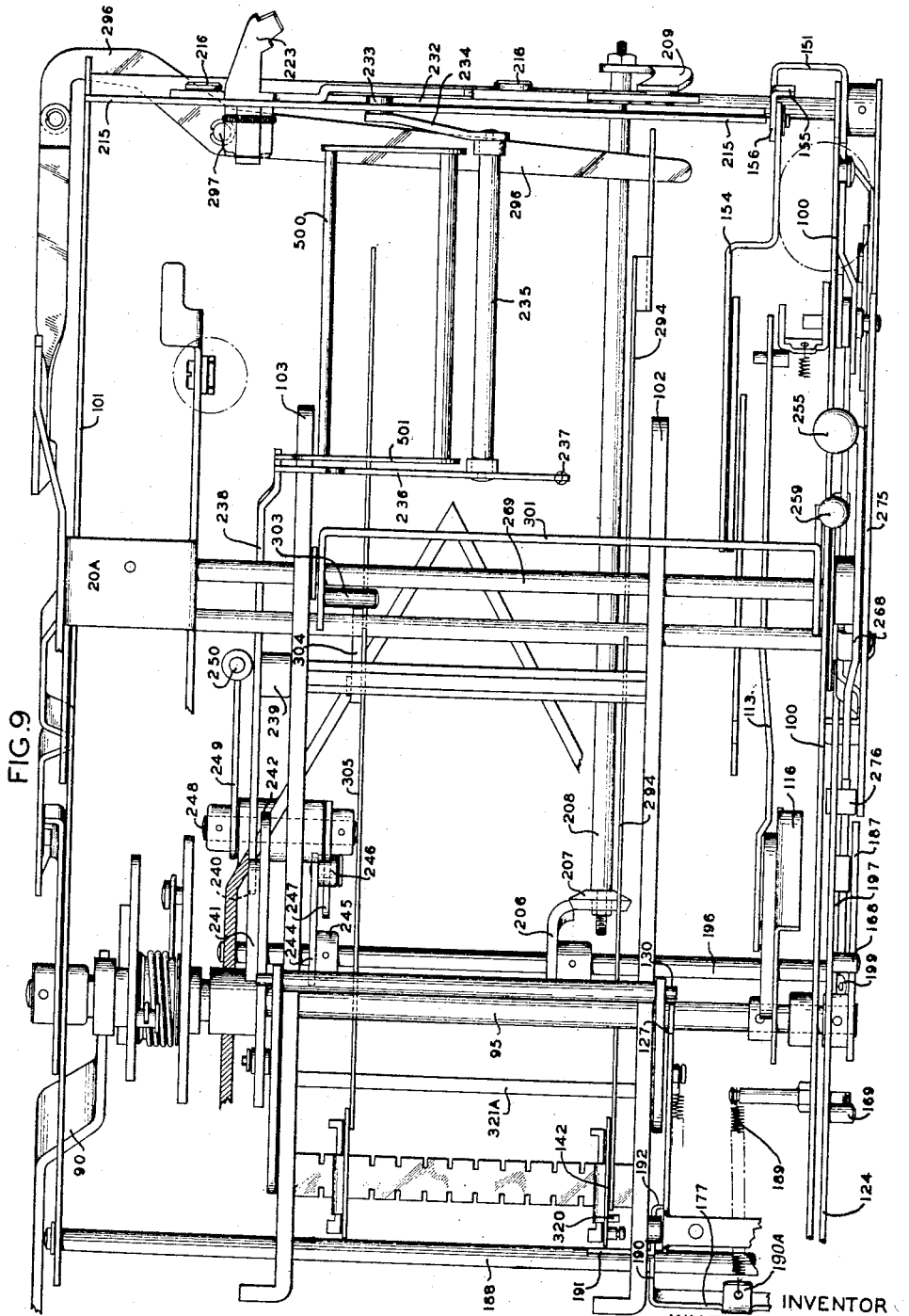

Sept. 9, 1941. W. W. LANDSIEDEL 2,255,622
COMPUTING MACHINE
Filed Feb. 15, 1937 16 Sheets-Sheet 8
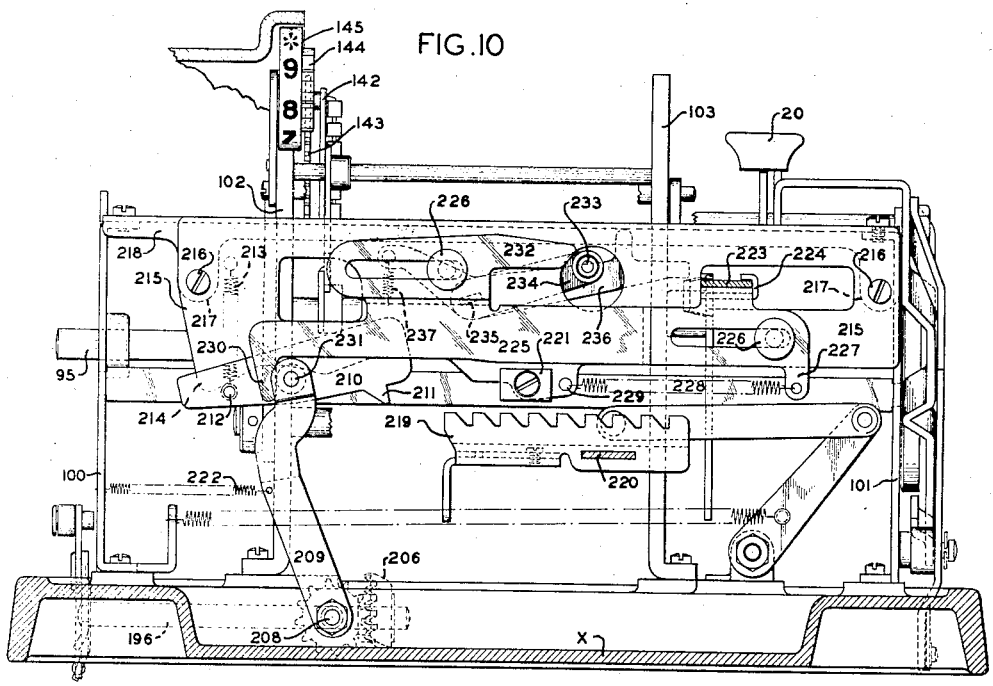
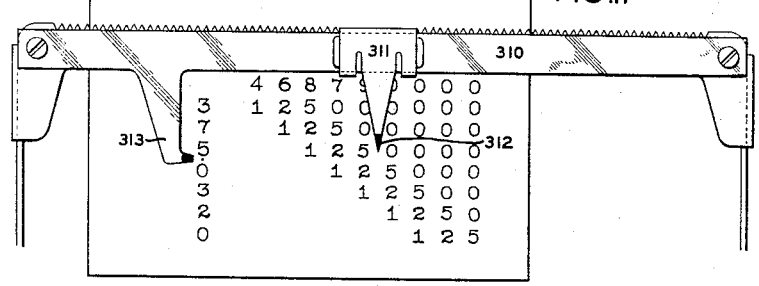
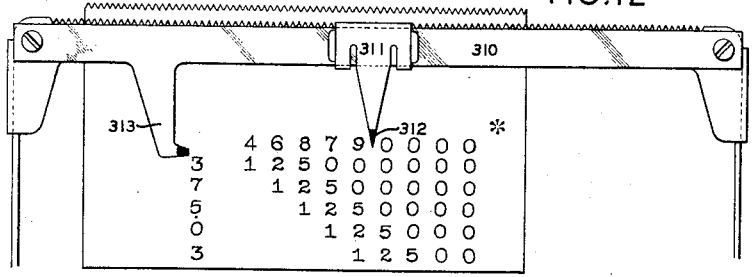
INVENTOR.
WALTER W. LANDSIEDEL
BY *H. A. Sparks*
HIS ATTORNEY.

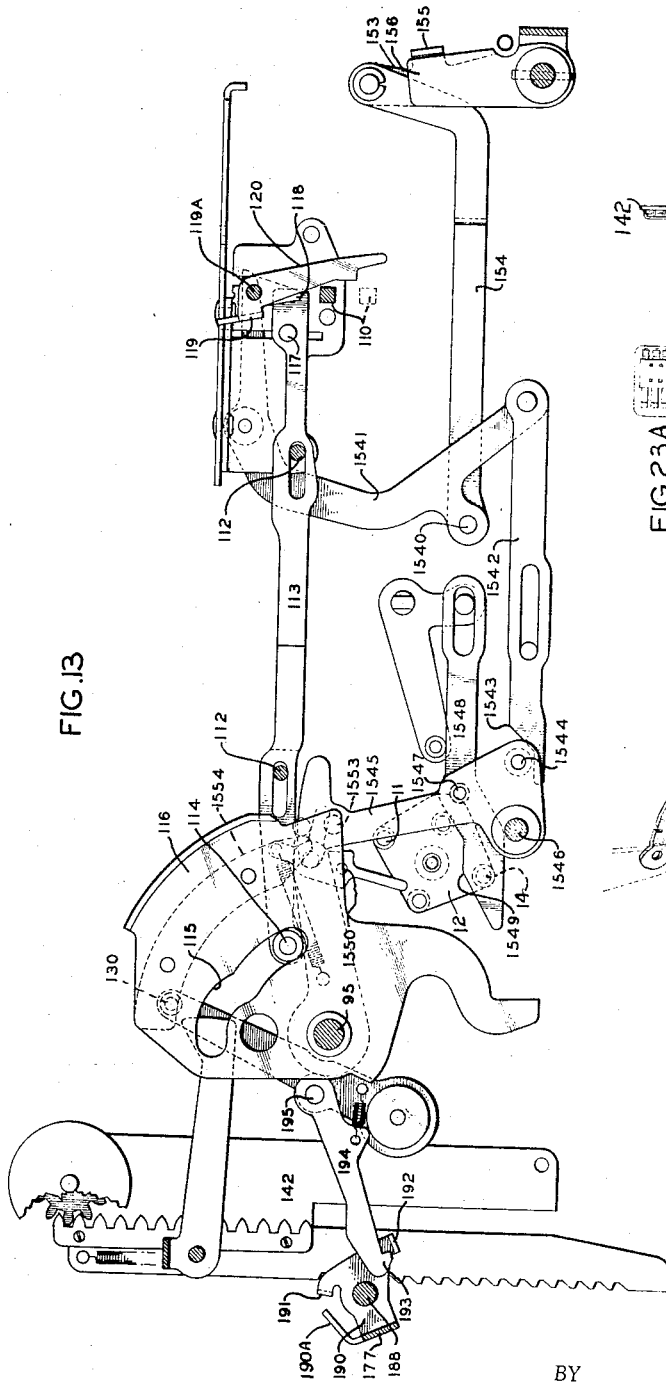

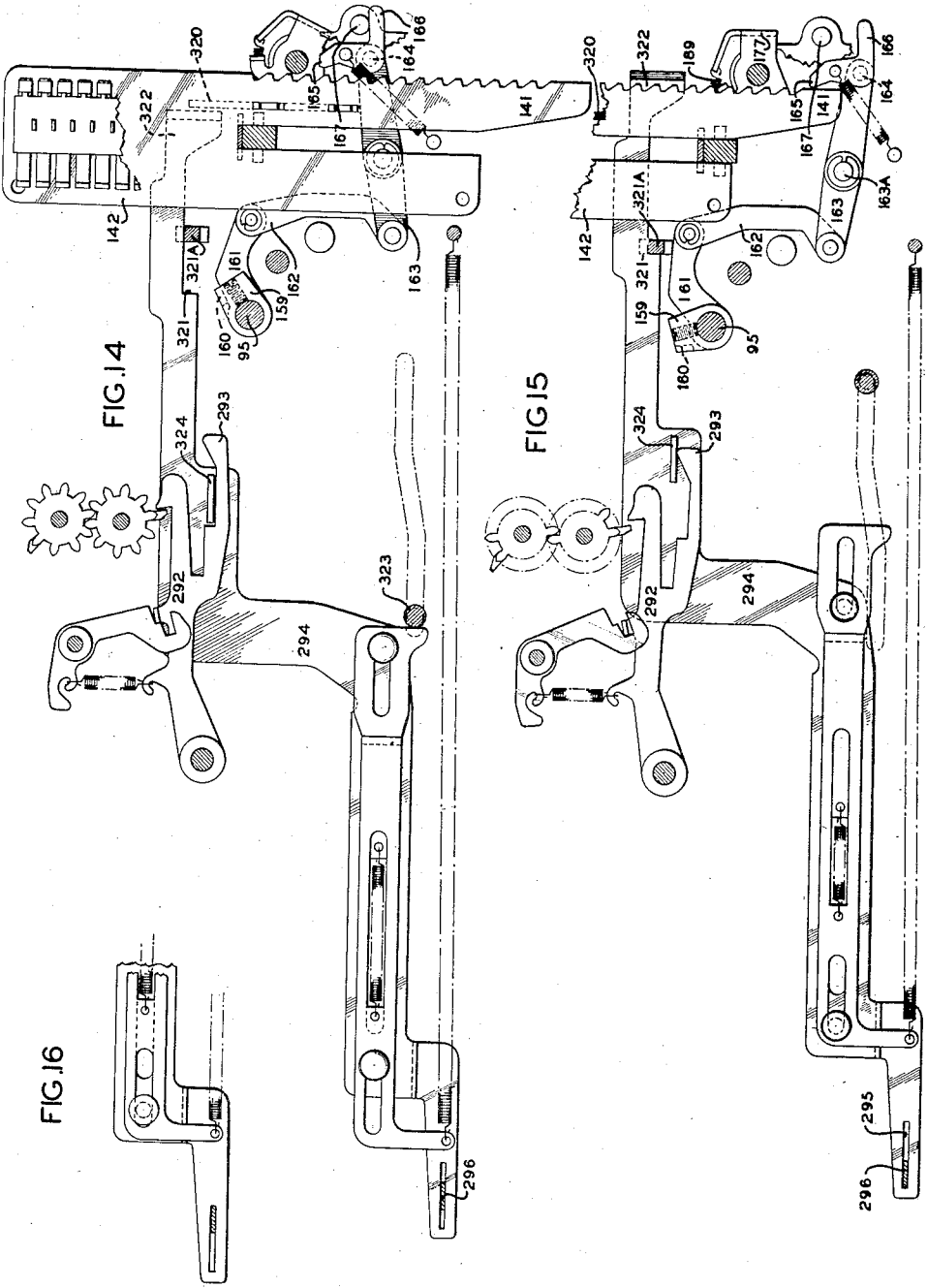

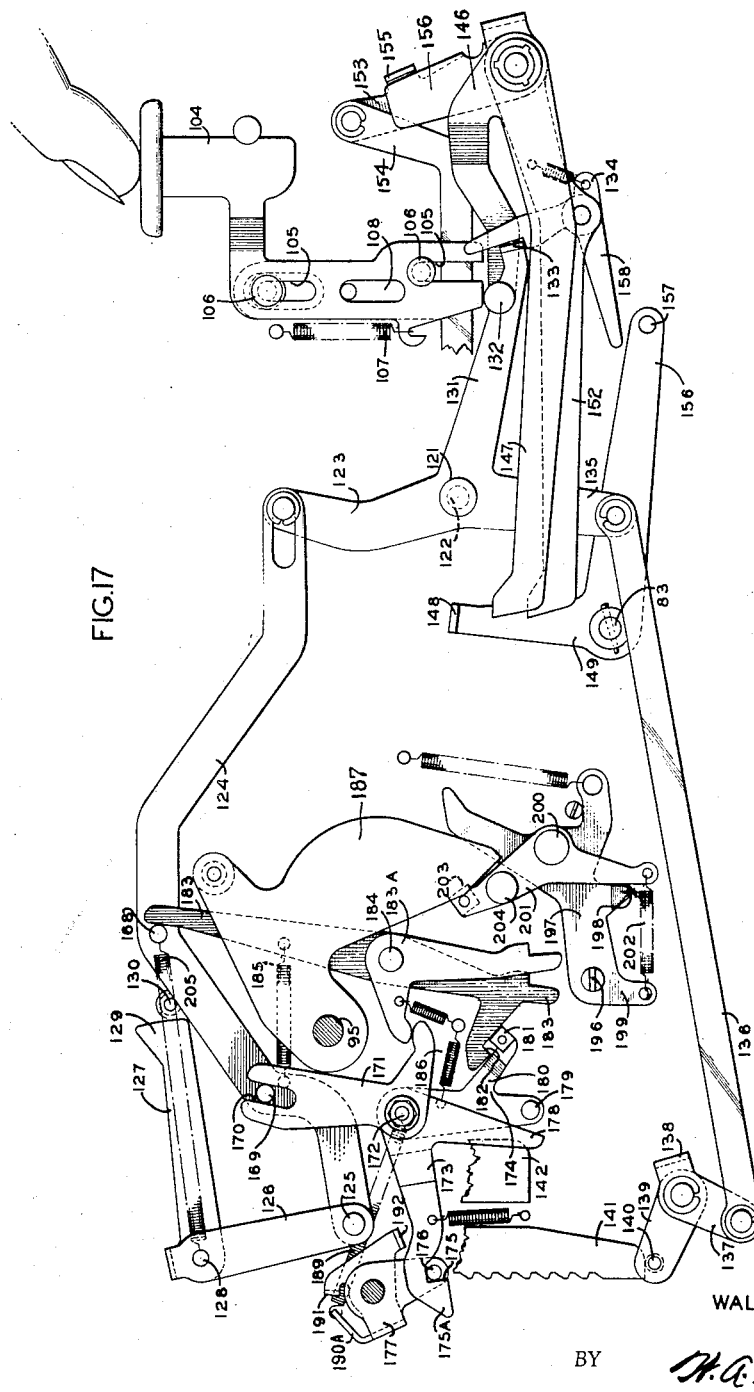

INVENTOR.
WALTER.W.LANDSIEDEL
BY
HIS ATTORNEY.

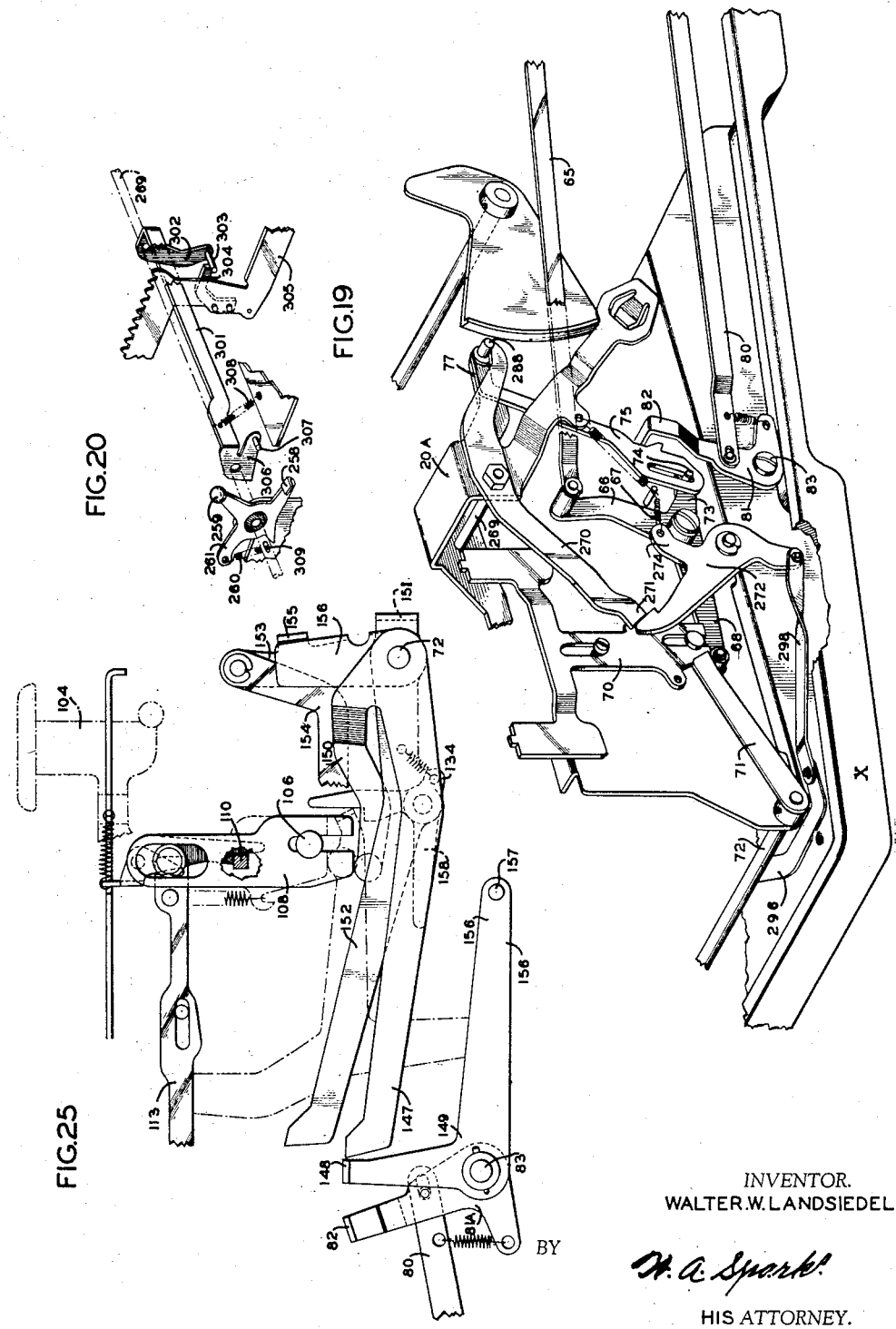

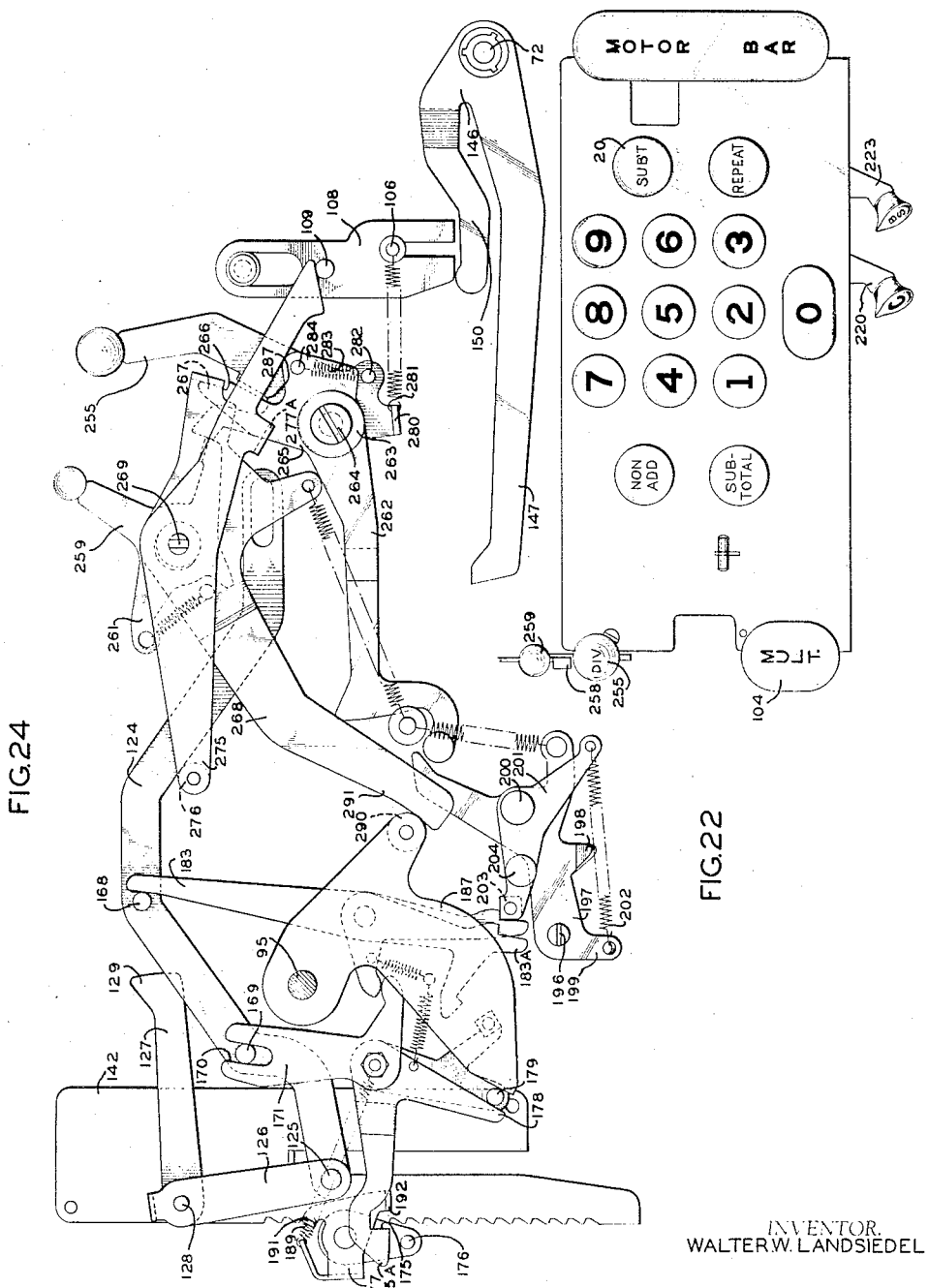

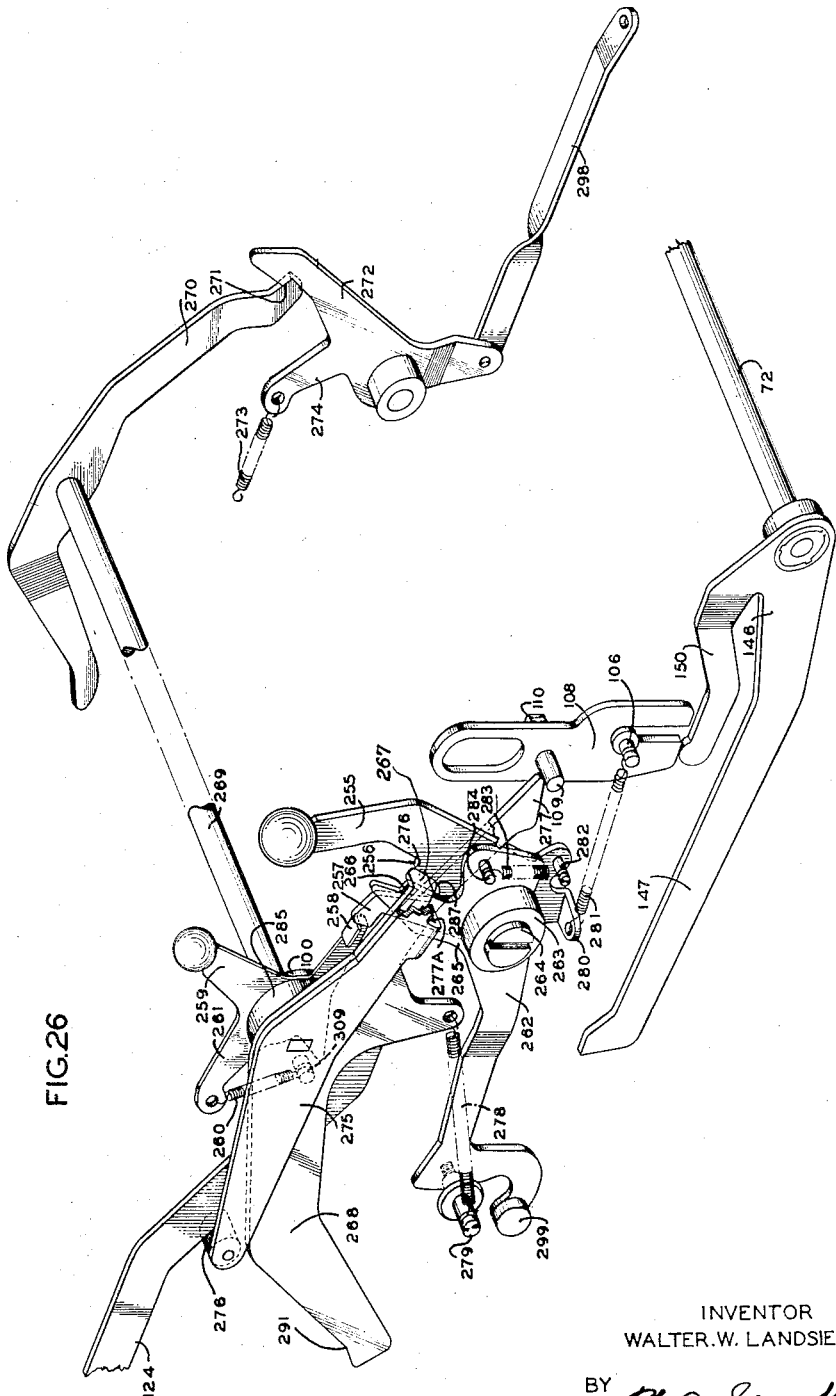

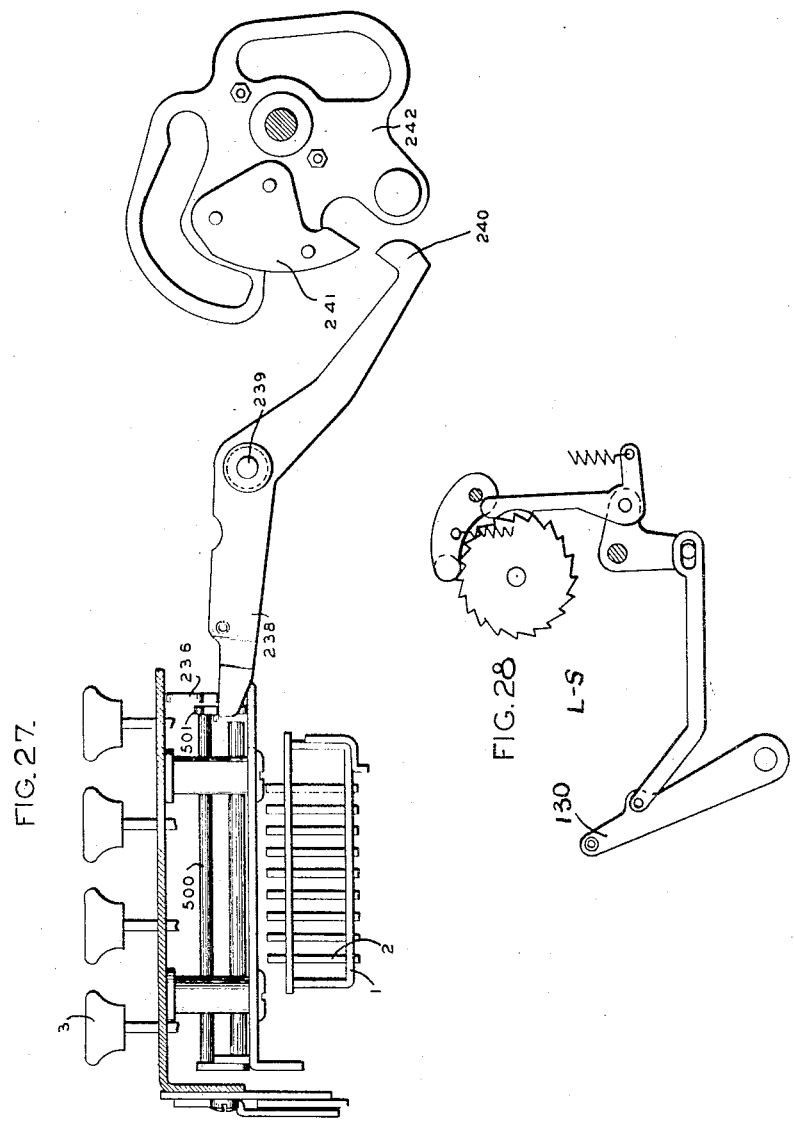

Patented Sept. 9, 1941

2,255,622

UNITED STATES PATENT OFFICE 2,255,622

COMPUTING MACHINE

Walter W. Landsiedel, Elmira, N. Y., assignor to Remington Rand Inc., Buffalo, N. Y., a corporation of Delaware Application February 15, 1937, Serial No. 125,704

12 Claims. (Cl. 235—60)

This invention relates to calculating machines and particularly to that type of machine wherein multiplication and division may be accomplished and a product or quotient and remainder may be printed.

The particular machine, in which the present invention is embodied, is of the same general type as that shown in the Patent 1,899,444 to T. O. Mehan, issued February 28, 1933, and is in the form of a general improvement upon the machine which is shown and described in Patent 2,203,336, dated June 4, 1940, and my copending application, Serial No. 73,020, filed April 6, 1936, wherein a series of control pins, contained in a movable pin carriage, is set up from the keyboard to control the rearward movement of a series of actuating racks which, at certain times, mesh with either the adding or the subtracting pinions of an algebraic totalizer unit to accumulate positive or negative amounts and wherein each amount entered in the machine may be listed upon a tape or record sheet. Totals are taken, in the usual manner after a blank stroke, as is disclosed in the Mehan patent mentioned above. The machine shown in Patent No. 2,203,336 is somewhat different from Mehan's machine in that it contains an algebraic totalizer and subtraction key. Because of this it contains a "fugitive one" mechanism and is made so that it will print true negative totals.

The present invention improves upon the direct subtraction machine by adding novel mechanism for performing multiplication and division whereby all the factors are printed upon a tape or record sheet, which is carried upon the platen of the machine. The present invention includes a dial for counting machine operations, a type rack which, in multiplication, prints the multiplier one digit at a time, and means for automatically printing a star if the multiply key is held depressed for more than nine consecutive machine cycles. It also includes means for performing fully automatic division in which the machine automatically effects back spacing and prints the digits of the quotient, one under another, on the left of the tape and in which the machine automatically stops after completing a problem. If there is a remainder, it will be printed by taking a total and this will, at the same time, clear the machine.

One object of this invention is to provide novel mechanism for accomplishing multiplication on an adding machine.

Another object is to provide a visible dial for counting machine cycles in multiplication and division.

A third object is to provide means for automatically back spacing the movable pin carriage during multiply or divide operations.

A fourth object is to provide means for automatically printing a star or asterisk when the multiply key is held depressed for more than nine machine cycles.

Another object of this invention is to provide means for automatically printing a star when, in division, the divisor has been improperly set up on the keyboard.

A further object is to provide novel mechanism for accomplishing fully automatic division.

Still another object of the present invention is to provide means for automatically stopping the machine, during a division operation, when the lowest order digit of the divisor reaches units column.

Another object is to provide a manual stop lever for stopping the machine during the process of division and before full division has been accomplished.

Another object is to provide means for printing the multiplier, in a multiplication problem, at a place apart from the printed multiplicand and product.

Another object of the invention is to provide means for printing the quotient, in division, at a place apart from the printed dividend, divisor and remainder, printing each successive digit directly under the preceding one.

Other objects and structural details of the invention will be apparent from the following description when read in connection with the accompanying drawings in which:

Fig. 2 is an elevational detail view of the accumulator operating mechanism.

Fig. 3 is a right hand elevation of the subtract key and associated mechanism for shifting the accumulator cradle from its "add" to its "subtract" position and vice versa and with the parts in the position they assume when the accumulator pinions are in mesh with their actuating racks.

Fig. 4 is a right hand elevation of substantially the same parts shown in Fig. 3 but showing the parts in the position they assume when the accumulator pinions are out of engagement with their respective actuating racks.

Fig. 5 is a fragmentary left hand elevation of the machine showing the parts with the machine casing removed.

Fig. 6 is a fragmentary right hand elevation of the machine with the casing removed and with parts of the base plate broken away.

Fig. 7 is a fragmentary right hand elevation of the machine showing part of the motor drive.

Fig. 8 is a fragmentary top plan view showing the motor drive.

Fig. 9 is a skeleton top plan view showing the back spacing mechanism and its associated parts.

Fig. 10 is a front elevation of the machine showing only the back space mechanism and such other incidental parts as are necessary to locate it.

Fig. 11 is a front elevation of the paper knife and tape showing the decimal point locating means.

Fig. 12 is a front elevation of the paper knife and tape showing the decimal point locating means in its operated position but with the tape in its lowermost position.

Fig. 13 is a left hand sectional elevation taken just inside the left hand outer frame plate showing the non-add mechanism and the detent release mechanism for the multiplier and quotient rack.

Figs. 14 and 15 are right hand sectional elevations of the multiplier and quotient rack showing the accumulator wheels of highest order, the special slide cooperating with them for automatically stopping the machine, and the mechanism for raising and holding the multiplier and quotient rack.

Fig. 16 is a fragmentary detail view of the forward end of the special slide shown in Figs. 14 and 15.

Fig. 17 is a left hand elevation of the multiply key and the associated parts which are moved immediately by depression of this key, certain parts remaining in normal position.

Fig. 19 is a fragmentary isometric taken at the right front corner of the machine and showing part of the subtraction mechanism.

Fig. 20 is a fragmentary isometric showing the manual machine stop lever, the adding rack of units or lowest order and the bail which operates in automatically stopping the machine.

Fig. 21 is an isometric view of the back space latch and the mechanism for cutting out the automatic carriage return positively during back space operations.

Fig. 22 is a top plan view of the keyboard showing the correction and single back space keys.

Fig. 23 is a rear elevation of the multiplier and quotient type rack.

Fig. 23A is a right-hand elevation of the multiplier and quotient type rack.

Fig. 24 is a left hand elevation showing the division lever and associated parts as they will appear at the end of the forward stroke of the first cycle in a division operation.

Fig. 25 is a left hand fragmentary elevation showing the stub key (and associated parts) in the position it assumes when it is latched down.

Fig. 26 is an isometric view showing the division lever in its tripped position and its associated parts.

Fig. 27 is a detail sectional elevational view of the key and main shaft interlock.

Fig. 28 is an elevational detail view of the line space mechanism.

The machine in which the present invention is embodied is of the ten-key, key-set, lever-operated type which has a reversible totalizer and which contains a movable stop carriage and a set of accumulator actuating racks controlled thereby to enter amounts into the totalizer. The totalizer itself is settable for either addition or subtraction. The present invention adds the features of multiplication by repeated addition and fully automatic division by repeated subtraction and prints the digits of the multiplier in multiplication and the digits of the quotient in division. The machine also has a dial for visibly counting machine cycles when multiplying or dividing and contains many other novel features and mechanisms which will be described in detail hereinafter.

Figure 1:
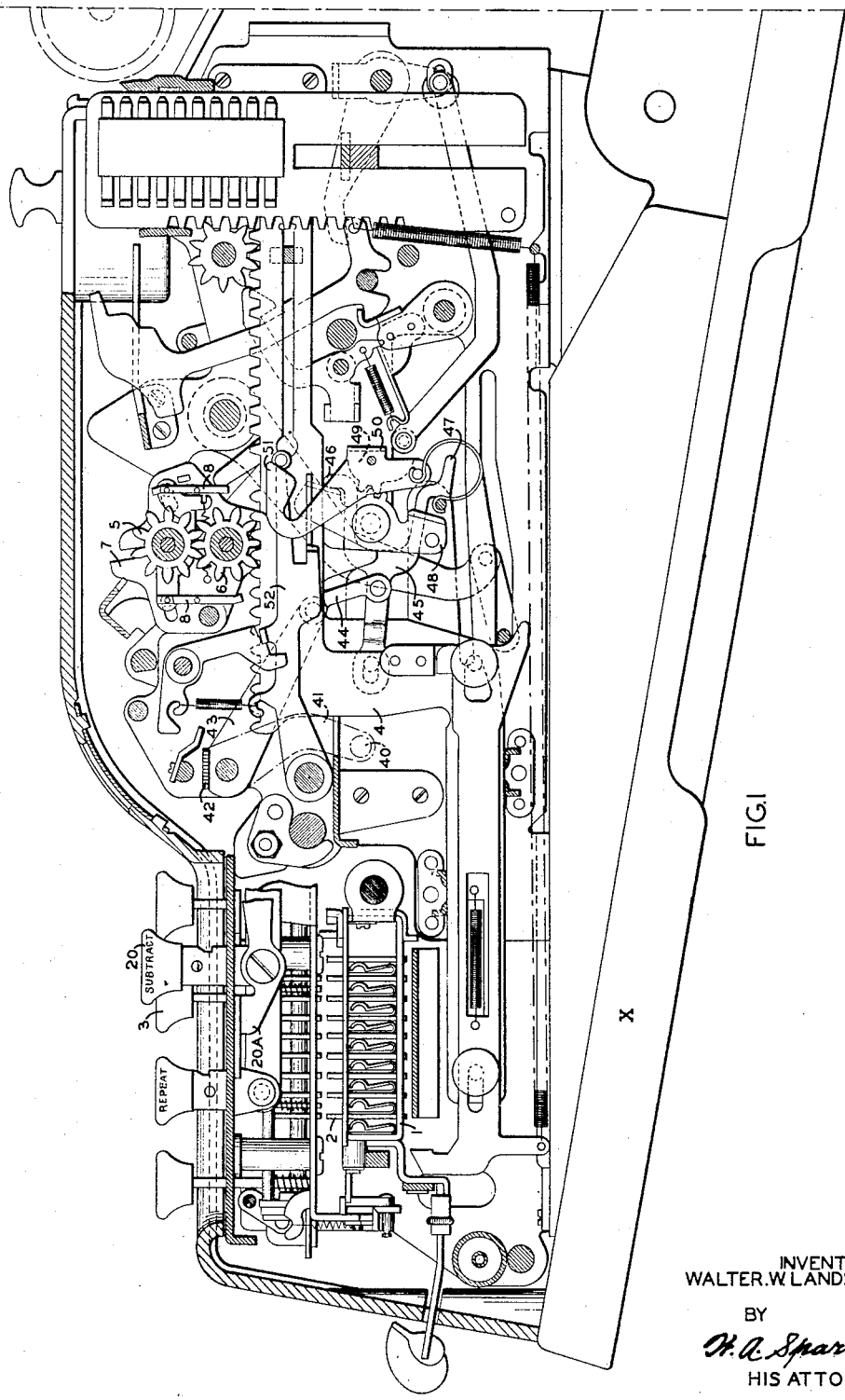
Fig. 1 is a sectional elevation taken just inside the right hand machine frame and showing the subtract key, the algebraic totalizer, the adding racks, the movable pin carriage, and the printing mechanism.

As will be seen from an examination of Fig. 1, the machine contains the usual pin carriage 1, movable from right to left and thence back to normal, which carries rows of pins 2 arranged in rows of 9 from front to rear which pins 2 are adapted to be depressed by the digit keys 3 of the machine. These pins 2 act as stops for the adding racks 4 as is old and well known.

The totalizer in this machine consists of two sets of pinions, designated as 5 and 6, respectively, which are in constant mesh with each other and which are held by a cradle 7. When the pinions are held out of mesh with their respective actuating racks 4, a set of spring pressed detents 8 retains the pinions in position. The mechanism for moving the pinions into and out of engagement with their respective racks 4 is shown in Fig. 2. Here, a wipe pawl 9, on the forward stroke of the main operating shaft 95 (in addition or subtraction), engages a pin 11 on a pin plate 12 to raise the accumulator cradle 7 (through the raising of accumulator catch 13) and thus raise the accumulator pinions out of mesh with their racks 4. On the return stroke, the wipe pawl 9 engages a pin 14 to reengage the accumulators, all of which is old in Mehan No. 1,899,444. In totaling the accumulator catch 13 is moved by linkage, not shown herein but shown in Fig. 5 of the copending application, Serial No. 68,694, clockwise about its pivot 13A, (by which it is attached to an accumulator raising bail arm 15), to its rearmost position. In doing this, the accumulator catch 13 cams the pin 16 into the slot 17 and thus turns the pin plate clockwise so that the wipe pawl 9 does not affect the pin 11 or raise the accumulators out of mesh on the forward stroke of a total taking operation. The accumulator bail arm 15 and, hence, the accumulator pinions are held positively in either their upper or lower position by a spring pressed detent 18 acting in conjunction with an accumulator lock 19 as is shown in Fig. 5 of the copending application, Serial No. 68,694.

Referring to Figs. 1, 3 and 4, it will be seen that subtraction is accomplished by depression of the subtract key 20 which raises the right hand arm 21 (as viewed from the front of the machine) of a bail shaped piece 22. The arm 21 holds, near its rear end, a leftwardly projecting pin 23 which constantly engages a slot 24 in a plate 25. The plate 25 is mounted for vertical sliding movement upon the left hand side, as viewed from the front of the machine, of a plate 26 by pin and slot connections so that the plate 25 may move up or down without affecting the plate 26. A cam 27 is mounted fast on the main operating shaft 95 and holds, upon its right hand side, two pins 28 and 29 respectively, which are adapted to engage one or another of two leftwardly bent ears 30 on the plate 25. The parts are so arranged that, if the plate 25 has been raised by depression of the subtract key as shown in Figs. 3 and 4, a counter-clockwise movement of the main operating shaft 95 will bring the pin 29 on the cam 27 into contact with the lower ear 30 of the plate 25 and will move this plate, together with the plate 26 to which it is attached, rearward where they will remain until the subtract key 20 is released. When the key 20 is released, the plate 25 will immediately fall to its lower position and, if the main operating shaft 95 is then swung counter-clockwise as seen in Figs. 3 and 4, the pin 29 will clear the lower ear 30 and the pin 28 will contact the upper ear 30 on plate 25 and will push both the plate 25 and its associated plate 26 forward. A T shaped rock arm 31 is mounted upon a suitable base plate bracket 32 and is fixed, for rotating movement, to the plate 26 by a pin and slot connection 33 so that when the plate 26 is moved rearward by depression of the subtract key and operation of the main shaft 95, the rock arm 31 will be swung clockwise and when the plate 26 is moved forward the rock arm 31 will be swung counter-clockwise and this will be accomplished during the first part of the forward stroke of the main operating shaft 95. Fixed to the right hand end of the accumulator cradle (as seen from the front of the machine) is a single pinion 34 (Figs. 3 and 4) which, when the accumulators are out of mesh with their respective actuating racks, meshes with a rack segment 35, fast to the left hand top part of the T shaped rock arm 31. It will, therefore, be seen that when the subtract key is depressed and the machine is operated, the T shaped rock arm 31 will be swung toward the rear of the machine and that this will revolve the accumulator cradle 180°, through its pinion 34, so that the set of subtraction accumulator wheels will be brought into vertical alignment with their actuating racks 4 (Fig. 1) and also that, when the subtract key is released and the machine is operated, the accumulator cradle will be revolved 180° in the opposite direction to bring the set of adding pinions into vertical alignment and operative relation with the actuating racks 4. A spring pressed detent 36, acting upon a roller 37, tends to hold the rock arm 31 in either its forward or rearward position and also to move the arm 31 to either position with a decided "snap." From the foregoing it is seen how the machine is conditioned for either addition or subtraction. As will be seen from Fig. 4, the plate 26 has, at its forward end, an oblong portion 38 which maintains, between two leftwardly bent off ears 39, a roller 40 which is integral with the right hand face (as seen from the front of the machine) of an arm 41 which is the right hand arm of a bail 42 as shown in Fig. 1.

All the preceding description has been given merely to give an accurate idea of the basic mechanisms in the machine and if further data is desired, it may be obtained from the drawings and specification of the aforementioned application. It was not intended that the description, given thus far, should be minute in detail but it was thought that a general description of the basic functions and mechanisms of the machine upon which the present invention is founded would be enough to clarify the methods of addition, subtraction and totaling.

*Motor drive*

The motor drive of the present machine is identical with that of the machine disclosed in the copending application and will be only briefly described here.

Referring to Figs. 6, 7 and 8 of the drawings, a small motor 53 is geared as shown to a clutch ratchet disk 54 so that, as the motor armature revolves, it positively drives the clutch ratchet but at a suitable reduced speed. The motor 53 may be made to run continuously but in the present instance it is turned on and off by means to be presently described. Loosely mounted upon a shaft 55, upon which the clutch disk 54 is made fast, is a crank disk 56 which carries upon its right hand side, (as viewed from the front of the machine), an engaging pawl 57 bearing a tooth 58 which is adapted to engage between the teeth of the clutch ratchet 54 and thus operate the crank disk 56 when the pawl 57 is released. A spring 59, anchored at one end to the crank disk 56 and at its other end to the top of pawl 57 tends constantly to draw the pawl into engagement with the clutch ratchet 54. A three armed bail shaped bell crank 60, having an upper arm 61 and a lower arm 62 on its right hand side and an arm 63 on its left hand side, is pivoted upon a fixed rod 64 which is secured to the base X of the machine by brackets not shown. The upper arm 61 of bell crank 60 has, pivoted to its top, the rear end of a link 65 which is connected at its forward end to the upright arm 66 of a three armed motor control bell crank 67. The forwardly extending arm 68 carries a stud 69 which is adapted to be engaged by either a stem 70 of the regular motor bar of the machine or by an arm 71 (Figs. 6 and 19) fast to a motor control shaft 72 which runs laterally across the front of the machine and is operated at its left hand end by the multiplication and division mechanism which will later be described in full. The rearwardly extending arm 73 of the motor control bell crank 67 carries a stud 74 upon its right hand side which operatively connects the motor control bell crank 67 with a link 75 by means of a slot 76 in the lower portion thereof. This link 75, as is more clearly shown in Fig. 19, is pivoted at its upper end to a rearwardly projecting finger 77 which is formed integral with the subtraction key lever 20A.

It will thus be apparent that the motor control bell crank 67 will be swung counter-clockwise about its pivot (Fig. 6) by depression of the subtraction key and consequent raising of link 75, by depression of the motor bar and consequent depression of its stem 70, and by the clockwise rotation of lever 71 (Figs. 6 and 19) and its shaft 72 through the multiplication and division mechanism and it will also be evident that the counter-clockwise rotation thus imparted to the motor control bell crank 67 will, through its upper arm 66 and link 65, pull the bail shaped bell crank 60 (Fig. 7) counter-clockwise about its pivot shaft. This will lower the arm 62 of the bell crank 60 out of the path of a heel 57A on the clutch engaging pawl 57 and will allow the pawl to snap into the teeth of the clutch ratchet 54. At the same time the arm 63 of bell crank 60, which has two steps cut into its forward face, will be lowered enough so that a spring pressed latch 78, which is pivoted at 79 to an upright wall formed integral with the base and which is normally retained by the lower step of arm 63, will snap toward the front of the machine (or clockwise as viewed in Fig. 7) until it is retained by the upper step on the arm 63. In so doing, the latch 78 will move forward a link 80 which is pivoted to latch 78 by a pin 81 and this link 80 will move a bell crank 81A, having a leftwardly bent over ear 82, counter-clockwise. Bell-crank 81A is fast to the right hand end of a shaft 83 which extends laterally across the front end of the machine. Also, the latch 78, when it snaps to its forward position will move down a contactor 84, which is secured to its top and which carries two contact points 85, so that the contacts 85 will engage contacts 86, held on an insulating strip 87 secured to the base, and a circuit will be completed to start the motor. From the above, it will be clear that, when the motor control bell crank 67 is rocked counter-clockwise, it pulls the link 65 forward and thus rocks the bail shaped bell crank 60 counter-clockwise and that this, in turn, engages the clutch and simultaneously starts the motor to turn the crank disk 56. The crank disk 56, as is shown in Fig. 7, carries a roller 88 on its right hand side which rides in a slot 89, cut in the rear end of a bell crank operating lever 90 which is pivoted to the base X at 91. The forward arm of the bell crank operating lever 90 carries a roller 92 which engages a radial slot 93, cut in an operating lever 94 which is yieldably connected through a strong spring (not shown) to the main operating shaft 95 of the machine. It will thus be evident that, when the crank disk 56 revolves once, it imparts, by means of its roller 88 and bell crank 90 and operating lever 94, first a forward or counter-clockwise movement (see Fig. 7) to the main operating shaft 95 and then a return or clockwise stroke. On the periphery of the crank disk 56, is a tooth 96 which engages the pin 81, by which the latch 78 and the link 80 are connected, near the end of every cycle of rotation of the crank disk 56. The tooth strikes the pin 81 from below (Fig. 7) and thus cams the latch 78 rearward so that a spring 97 (anchored at its top to the latch 78 and at its bottom to the arm 62 of bell crank 60) snaps the bail shaped bell crank clockwise and brings the lower step on arm 63 thereof, up into position to retain the latch 78 in its rearward or normal position. However, if something holds the link 65 in its forward position, through the bell crank 67, the tooth 96, on the crank disk 56, will cam the latch 78 rearward or counter-clockwise but the link 65 will prevent the bell crank 60 from moving and the latch will immediately return to its forward position on the top step of arm 63. It is thus evident that even though the motor circuit is broken once for each revolution of the crank disk 56 it will be reestablished immediately and the machine will continue to operate until the motor control bell crank 67 is returned to normal position.

Machine frames

The framing of the present machine may be seen by referring to Figs. 5, 6, 9 and 10 and consists of base plate X, left outer frame plate 100, right outer frame plate 101, left inner frame plate 102 and right inner frame plate 103. The frame plates 100, 101, 102, and 103 are all securely screwed to the moulded base X and it is upon these four frames and base that all the mechanism in the machine is mounted.

Multiplication

Referring particularly to Figs. 5 and 17, a multiply key 104 is mounted by slots 105 upon headed studs 106 which are fast to the left hand outer frame plate 100 and which guide the key for vertical sliding movement. A spring 107 tends to constantly draw the multiply key 104 to its upper or normal position. Between the key 104 and the frame plate 100, lies a stub key 108 (shown in isometric in Fig. 26), which is also guided for vertical movement by the studs 106 and which has a round pin 109 protruding from its left hand side and a square pin 110 (see Fig. 26) protruding from its right hand side, the pins 109 and 110 being axially aligned on opposite sides of the stub key 108. The leftwardly protruding pin 109 rides in a slot 111 cut in the multiply key 104 so that, whenever the multiply key is depressed, it depresses the stub key 108 and the stub key will be latched down for one extra machine cycle after the multiply key has been released.

The mechanism for latching down the stud key 108 and for releasing it will now be described. Mounted for forward and rearward sliding movement, (Fig. 13), upon two studs 112 is a link 113 which carries, at its rear end, a roller 114 which rides in a cam slot 115, cut in a cam 116 fast upon the main operating shaft 95. It will thus be seen that the link will be positively moved forward and rearward once for every operating cycle of the machine. At the forward end of link 113 is a pin 117 which, when the link is moved forward, pushes against the right hand arm 118 of a spring pressed bail 119, which is pivoted upon a stub shaft 119A which is mounted upon the right hand face of the left outer machine frame plate 100, and swings the bail counter-clockwise as seen in Fig. 13. The left hand arm 120 of the bail 119 is made in the form of a latch so that it engages the square pin 110 on the right hand side of the stub key 108. Since the operator does not remove his finger from the multiply key until the end of a return multiply stroke, as will presently be described, the bail arm 120 latches the stub key down until the next cycle. Hence the stub key operates the machine for one extra cycle after the multiply key is released.

Referring again to Figs. 5 and 17 and particularly to Fig. 17, it will be seen that a three armed bell crank 121 is pivoted at 122 to the left hand outer frame plate 100 and that the upper arm 123, thereof, is connected by a pin and slot to a link 124. This link 124 extends rearwardly and is pivoted at 125 to the downwardly extending left hand arm 126 of a bail shaped bell crank whose right hand arm 127 extends forwardly of its pivot shaft 128 and carries a toe 129 which is adapted to be positioned in the path of the regular hammer restoring bail 130 whenever the link 124 is pulled toward the front of the machine or toward the right in Figs. 17 and 5. The forwardly extending arm 131 of the bell crank 121 carries a lamination 132 near its front end which lies in the same vertical plane as the multiply key 104 and which is adapted to be engaged by the bottom of the key 104 but which is never at any time engaged by the stub key 108. The arm 131 carries at its forward end a leftwardly, (as seen from the front of the machine), bent off lug 133 which normally engages a spring pressed latch 134 later to be described. The lower arm 135 of the bell crank 121 is pivoted to the forward end of a link 136 which extends rearwardly in the machine and which is pivotally connected, at its rear end, to the downwardly extending left hand arm 137 of a bail 138, the right hand arm 139 of which extends rearwardly and carries a pin 140 which is adapted to engage the tail 141 of a multiplier and quotient type rack 142. All parts of the machine are shown in normal position in Fig. 5. Referring to Figs. 5, 6, 14, 23A and 23, it will be seen that the multiplier and quotient type rack 142 is formed exactly like the regular type racks except that it has a series of teeth cut into its tail piece 141 and that the tail piece extends below the usual level of the regular type rack bottoms. The type are arranged with the zero in the uppermost position and a star in the lowest position (see Fig. 23) and the type rack 142 is raised one tooth space for every multiplication or division cycle of the machine as will be explained in detail later on. As will be seen from Figs. 5 and 10, the type rack 142 carries upon its left hand side a rack plate 143 which meshes with a gear 144 fast on the right hand side of a multiplier and quotient dial 145, which normally shows a star, so that, every time a multiplication or division cycle occurs, the type rack 142 is elevated one tooth space and the dial 145 is rotated to show the next succeeding numeral. Referring to Figs. 5 and 17, it will be seen that mounted fast upon the extreme left hand end of the motor control shaft 72, which, as has been previously mentioned, extends laterally across the front of the machine and through the lever 71 (shown in Fig. 6) operates the tri-armed motor control bell crank 67 to start the motor, is a two armed lever 146, both arms of which extend rearwardly in the machine. The lower arm 147 of the lever 146 extends rearwardly under the leftwardly bent off ear 148 of a bell crank 149 which is mounted upon the extreme left hand end of shaft 83 (Figs. 5, 6 and 17) which, as was previously mentioned, runs laterally across the entire machine and carries, at its extreme right hand end, the bell-crank 81A (Fig. 6) which is reciprocated once for every machine operating cycle. The upper arm 150 (Figs. 5 and 17) of the two armed lever 146 is offset toward the right hand side of the machine and is so positioned that it underlies the bottom of the stub key 108 and is operated by the stub key when the multiply key 104 is depressed. The lever 146, with its arms 150 and 147, and the stub key 108 are clearly shown in isometric in Fig. 26. Loosely mounted upon the motor control shaft 72 (Figs. 5 and 17) and directly to the right (as viewed from the front of the machine), of the two armed lever 146 is a bail shaped bell crank 151 having a rearwardly extending arm 152, upon the right hand side of which is pivoted the latch 134, and an upwardly extending right hand arm 153 to which is pivoted the forward end of an offset link 154 which controls the non-add mechanism of the machine shown in Fig. 13.

As shown in Fig. 13, the link 154 is pivoted, at 1540 to a lever 1541 which is operated by the regular non-add key (not shown) of the machine. When the non-add key is depressed or when the link 154 is moved toward the rear of the machine, a link 1542, pivoted at its forward end to the bottom of the non-add lever 1541, is moved toward the rear of the machine. A cam surface 1543, cut in the rear edge of the link 1542, then engages a rightwardly (as viewed from the front of the machine) extending pin 1544 which is fast in a rock lever 1545, and thus cams the rock lever 1545 in a counter-clockwise direction about its pivot shaft 1546. The rock lever 1545 carries a pin 1547 which extends rightwardly therefrom and which supports and pivots the rear end of a wipe pawl disabling link 1548 and it will thus be seen that, when the rock lever 1545 is swung counter-clockwise, it will move the wipe pawl disabling link 1548 toward the rear of the machine. This link 1548 carries, upon its rear end, a cam surface 1549 which is adapted, when the link 1548 is in its rearward position, to contact a pin 1550, which protrudes from the left hand side of the wipe pawl, and prevents it from touching the pin 14 on the pin plate 12 which plate is used, as is well known, to raise and lower the accumulator pinions. It will, therefore, be seen that, on the forward stroke of any non-add cycle, the wipe pawl will swing down and contact the pin 11 and move the accumulators out of mesh. It will then continue until its pin 1550 contacts the cam surface 1549 on link 1548 and will be held out of contact with the pin 14 so that the accumulators will remain out of mesh until the very end of the return stroke when they will be thrown into mesh with their respective adding racks by mechanism which is shown and described in Patent 2,203,336. A pin 1553 which protrudes leftwardly from the top of the rock lever 1545 cooperates with a flange 1554 on the total cam of the machine so that the rock lever is positively retained in either its forward or its rearward position throughout an entire machine cycle as is old and well known in the art. Returning to Figs. 5 and 17, the upright arm 153 of the bail shaped bell crank 151 has a leftwardly bent off ear 155 which is adapted to engage a short lever 156 fast upon the shaft 72 so that when the non-add key (not shown) is depressed and pulls link 154 toward the rear of the machine, the ear 155 on arm 153 swings the lever 156 counter-clockwise to start the motor. The bell crank lever 149 carries a forwardly extending arm 156 which holds a rightwardly extending pin 157 which is adapted to strike a tail piece 158, formed integral with the latch 134, to release the latch, after the first multiply cycle, which in turn will release the bail shaped bell crank 151 and consequently permit the restoration of the non-add mechanism to normal through the influence of a spring connected to the pivot 1540 of link 154, Fig. 13.

It will be evident from the description given thus far, that when the multiply key 104 is depressed, it depresses the stub key 108 through its pin 109, and the stub key, in turn, depresses the lever 146 which starts the motor. It will also be evident that when the multiply key 104 is depressed, it swings the three armed bell crank 121 clockwise about its pivot 122. When the bell crank 121 swings clockwise, its forward arm 131, bearing the lug 133, depresses the latch 134 and, consequently, the bell crank 151 which sets the non-add mechanism. At the same time, the lower arm 135 of bell crank 121, through link 136, raised the type rack one space and thus brings a zero to the vision opening associated with the multiplier and quotient dial 145. The upper arm 123 of bell crank 121 pulls forward the link 124 and thus blocks the hammer restoring bail 130 which causes a non-print operation. It will also be understood that, on the return stroke of this first multiply cycle, the bell crank 149 will turn a short distance counter-clockwise, as seen in Figs. 5 and 17, and the pin 157 will hit the tail piece 158 of latch 134 and release the latch and its associated bell crank 151 and the bell crank will remain in normal position after the first multiply cycle even though the multiply key 104 is held depressed.

The mechanism for turning and securing the multiplier and quotient dial 145 is shown in Figs. 5, 6, 9, 13, 14, 15, 17 and 24. As will be seen in Figs. 14 and 15, a short arm 159, having a leftwardly bent over ear 160, is made fast to the main operating shaft 95 and adjacent the short arm 159 and directly in the path of the ear 160, is pivoted upon the main shaft 95, an arm 161 which extends toward the rear of the machine and to which is pivoted the top of a link 162, the lower end of which is pivoted to the forward end of a rock lever 163, pivoted at 163A to the base of the machine. The rearward end of the rock lever 163 carries a spring pressed raising pawl 164 having a nose 165 which is adapted to engage the teeth of the rack 142. The pawl 164 carries a tail 166 which normally presses upward against a pin 167 which is fast in the machine frame. The parts are shown in normal position in Fig. 14 wherein the type rack 142 is in its lowest position, and the ear 160, acting on the arm 161, has moved the rock lever 163 so that the tail 166 of pawl 164 is pressing against the pin 167 to disengage the pawl from the rack teeth. It will thus be evident that, when the main shaft 95 rotates counter-clockwise (Fig. 14) during its forward stroke, the ear 160 will move with it and release the arm 161 so that the spring attached to pawl 164 will move the rock arm 163 clockwise (Fig. 14) which will lower the pawl 164 and bring its tooth 165 into engagement with the teeth of rack 142. It will also be evident that, upon the return stroke of the main shaft 95, the ear 160 will push the arm 161 clockwise and thus raise the pawl 164 and the type rack 142 and that, when the rack 142 has been raised one tooth space, the pawl 164 will be disengaged therefrom by its tail 166 and the pin 167, and it will further be evident that the multiplier and quotient type rack 142 will be raised to show a new numeral on the dial 145 at the end of a multiply or divide cycle.

The mechanism for holding the type rack 142 in elevated position will be more clearly seen in Figs. 5, 13, 17 and 24. Referring particularly to Figs. 5 and 17, it will be seen that the link 124 holds two leftwardly protruding pins 168 and 169 and that the pin 169 constantly engages a slot 170 in the upper end of a bell crank 171 which is pivoted upon a stud 172 which projects from the left hand outer frame plate 100. Loosely mounted upon this same stud 172 are two cooperating latches 173 and 174. The latch 173 is bell crank shaped and has a hook 175 formed upon its rearwardly extending arm which is adapted to cooperate with a pin 176 which protrudes leftwardly from a bail shaped rack detent 177. The latch 173 is spring pressed counter-clockwise, as seen in Figs. 5 and 17, and its lower or downwardly extending arm 178 is adapted to be acted upon, at certain times to be later explained, by a pin 179 which protrudes leftwardly from the lower end of the latch 174. Near the center of the latch 174, and extending forwardly in the machine therefrom, is a short arm 180 which bears, at its extreme forward end, a square lamination 181 which is adapted to cooperate with a hook 182 on the tail of a loosely pivoted back space latch 183 which is constantly urged counter-clockwise (Figs. 5 and 17) about its pivot stud 184 by its spring 185. The pivoted latch 174 is, likewise, urged counter-clockwise by a spring 186. A heart shaped cam 187, mounted fast upon the main shaft 95, swings clockwise as seen in Figs. 5 and 17 upon the forward stroke of each operating cycle of the machine and counter-clockwise back to its normal position, shown in Figs. 5 and 17, upon each return stroke. It will thus be seen that, upon the forward stroke of any machine cycle, the heart shaped cam 187 will swing clockwise with the shaft 95 until it contacts the pin 179 on latch 174 and that it will then carry the latch 174 clockwise against the tension of spring 186 so that the square lamination 181 will be carried out of the path of the hook 182 on latch 183 and so that the pin 179 on latch 174 will contact the arm 178 of latch 173 and swing said latch 173 clockwise to a position where its hook 175 will not engage the pin 176 on the bail shaped detent 177. The parts are shown in the position just described, (at the end of the forward stroke) in Fig. 24 wherein the detent member 177 is engaging the teeth of the multiplier and quotient rack 142, as will now be described in detail.

As will be seen in Figs. 9, 13 and 17, the detent 177 is formed in the shape of a bail and is loosely pivoted upon a shaft 188 which extends, through the frame plates, laterally across the rear of the machine and it will also be seen that a spring 189, fastened at one end to a finger 190A bent off from bail 177, tends constantly to pull the detent 177 clockwise as viewed in Fig. 17. The left hand arm of the detent 177 extends downwardly (Fig. 17) and holds the pin 176 while the right hand bail arm 190 (Figs. 9 and 13) has a lug 191, on its top side, which is bent off toward the right hand side of the machine and which is adapted to engage the teeth of the multiplier and quotient rack 142 and to hold the same elevated during either multiplication or division machine cycles. The right hand bail arm 190 also carries, on its lower portion, a leftwardly bent off lug 192 (Fig. 13) which is adapted to be engaged by a hook 193 on the rear end of a spring pressed arm 194 which is pivoted at 195 to the hammer restoring bail 130. This hammer restoring bail 130 is only released, so that it may move counter-clockwise in the middle of and return at the end of certain multiply and divide cycles (as will be immediately explained), so that, on all cycles between printing cycles, the hammer restoring bail 130 will be held as shown in 17 and 13 and the detent 177 will be free to hold the rack 142. From the foregoing description, it will be seen that, when the heart shaped cam 187 (Fig. 24) has moved the parts as shown to release the pin 176 (and consequently the bail 177), the bail 177 will be drawn, by its spring 189, so that the lug 191 will engage the teeth of rack 142 and that, as the rack 142 is raised step by step, the teeth thereon will ratchet past the lug 191 until a printing cycle occurs at which time the hammer restoring bail 130 (Figs. 13 and 17) will swing toward the type racks and the hook 193 will engage the lug 192 (Fig. 13) of bail 177 and then draw the detent 177 counter-clockwise (Fig. 13) to withdraw the lug 191 from the teeth of rack 142 and allow the rack to drop to normal position. It will also be seen that, when the detent 177 is swung counter-clockwise (Fig. 17) by the hammer restoring bail 130, the pin 176 will be moved to a position where the hook 175 on latch 173 will again engage it and hold the bail in inactive position until another machine cycle releases it as aforementioned.

At this point, a general description and sample printing of a multiplication problem will be given. Considering the problem of 125×375, the actual printing on the tape will read as follows:

```
     3     12500
     7      1250
     5       125
            46875
```

It will thus be seen that the multiplier is printed, one digit at a time, at the left hand side of the tape and that the product 46875 is printed at the right and bottom. The actual machine cycles used in obtaining the above printing, however, are as shown below, i. e.:

|  |  |  |
|---|---|---|
| 1st printing and automatic back space 3 | N. A. & N. P. | 12500 |
|  | A. & N. P. | 12500 |
|  | A. & N. P. | 12500 |
|  | A. & P. | 12500 |
| 2nd printing and automatic back space 7 | N. A. & N. P. | 1250 |
|  | A. & N. P. | 1250 |
|  | A. & N. P. | 1250 |
|  | A. & N. P. | 1250 |
|  | A. & N. P. | 1250 |
|  | A. & N. P. | 1250 |
|  | A. & N. P. | 1250 |
|  | A. & P. | 1250 |
| 3rd printing and automatic back space 5 | N. A. & N. P. | 125 |
|  | A. & N. P. | 125 |
|  | A. & N. P. | 125 |
|  | A. & N. P. | 125 |
|  | A. & N. P. | 125 |
|  | A. & P. | 125 |
| 4th printing—(totaling operation) |  | 46875 |

With the foregoing sample of actual machine operations in mind, it will be seen that the multiplicand 125 is first set up on the keyboard and then a number of zeroes, equal to one less than the number of digits in the multiplier, is added. The regular repeat key (shown in Fig. 22) which disables the stop carriage return mechanism is latched down and the multiply key 104 is manually held depressed until the digit "3" shows upon the multiplier and quotient dial. The multiply key is then released and an extra machine cycle occurs, due to the stub key, and the first printing takes place and the stop carriage is automatically back spaced as will be described hereinafter. The first machine cycle was a non-add and non-print cycle, the second cycle was an add and non-print cycle, the third was an add and non-print cycle, and the fourth was an add, print, back space and line space cycle (it will be understood that line spacing occurs only during printing cycles). The multiply key 104 is then depressed until a 7 shows on the multiplier and quotient dial, at which time the multiply key is released and, as shown in the example, a 7 is subsequently printed at the left of the tape and 1250 is printed at the right. On this cycle, the machine is back spaced and stopped automatically. The multiply key is now depressed and held until a 5 shows on the dial and is then released. The machine goes its extra cycle and prints a 5 at the left of the tape and 125 at the right. The repeat key is now released, the stop carriage is manually cleared, and a total is taken in the usual manner and, thus, the product 46875 is printed at the right of the tape.

The line-space mechanism of the present machine is the same as that described in Patent No. 2,114,604, to T. O. Mehan, issued April 13, 1938, and shown in Fig. 6, thereof. In the above patent, the line-space mechanism is driven from a cam 25 (on the main shaft) through link 27. In the present machine, the line-space mechanism designated generally as L—S (see Fig. 28) is driven by the hammer restoring bail 130 so that line spacing occurs in printing cycles only.

Back spacing is accomplished, in the present machine, in a manner which makes it entirely automatic but which still allows the machine to be manually back spaced if desired. Parts of the back space mechanism are shown in Figs. 5, 9, 10, 17, 21 and 22. Referring particularly to Figs. 5, 17, 9 and 10, it will be seen that a shaft 196 runs laterally across the rear of the machine and terminates, at its right hand end, just outside the right hand inner frame plate 103. Screwed fast to the left hand end of the shaft 196 is a plate 197 (Figs. 5, 17 and 9) which has two leftwardly offset ears 198 and 199. Pivoted at 200 upon the plate 197 is a pawl 201 which holds, at one end, the forward end of a spring 202. The rear end of the spring 202 is anchored to the ear 199 of plate 197 and spring 202 tends constantly to draw the pawl 201 against the ear 198 as is shown in Fig. 17. At the opposite end of pawl 201 and upon its right hand side is mounted a square lamination or boss 203 which is adapted to be engaged by either the spring pressed latch 183 or by a second spring pressed latch 183A. Upon the left hand face of the pawl 201 lies a round boss or lamination 204 which is adapted when the pawl is released, to be engaged by the point of the cam 187. It will be seen that, if the pawl 201 has been allowed to stand in the position shown in Fig. 17 after the cam 187 has passed on its forward stroke, the cam 187 will, on its return stroke, engage the round lamination 204 on the pawl 201 and move both the pawl and the plate 197, as a unit, clockwise (Fig. 17) together with the shaft 196. Normally, as seen in Fig. 5, the pawl 201 is held against the tension of its spring 202 by the latch 183 which normally engages the square lamination 203. The latch 183A is, at this time, held in inactive position by the bell crank 171 whose position is controlled by the stud or pin 169 on the link 124. However, as soon as the multiply key is moved down, the latch 183 is swung clockwise by pin 168 on link 124 to the position shown in Fig. 17 and the pawl 201 is released so that it assumes its upright position shown in Fig. 17. Simultaneously, the pin 169 on link 124 will move the bell crank 171 clockwise (Figs. 5 and 17) and this will allow the spring pressed latch 183a to move counter-clockwise to the position shown in Fig. 17. The forward stroke in the first multiply cycle now begins and the point of the heart shaped cam 187 contacts the round boss 204 on the pawl 201 and moves the pawl counter-clockwise about its pivot 200 to a place where the square lamination 203 is engaged and held by the latch 183A. The pawl 201 is held here by latch 183A until the multiply key is released at which time the link 124 is allowed to return to its normal rearward position (shown in Fig. 5) under tension of a spring 205 shown in Fig. 17. This rearward movement of the link 124, occurs at the end of the return stroke of the cycle wherein the multiply key 104 is released and the pin 169, on link 124, moves the bell crank 171 counter-clockwise which positively moves the latch 183A clockwise and releases the pawl 201 which immediately snaps up to the position shown in Fig. 17. The latch 183, which was held in ineffective position by the pin 168 on link 124 while the multiply key was held depressed, is now held in ineffective position by its tail engaging the square lamination 181 on the arm 180 of lever 174. It will be remembered that a number only appears in full upon the multiplier and quotient dial at the very end of the return stroke of any multiply or divide cycle and that the operator takes his finger off the multiply key after he sees the number he wants. It will thus be seen that, since the multiply key is released at the end of a multiply cycle and since the stub key 108 is released during the middle of a cycle, the stub key will be held down by the mechanism shown in Fig. 13 for one extra cycle after the multiply key 104 has been released. It will, further, be noted that the cam 187 (Fig. 17) which moves the lever 174 clockwise away from the tail 182 of latch 183 at the end of every forward machine stroke will release the lever 174 in the first part of every return stroke so that it will hold the hooked tail 182 of the pawl 183. Hence, it will be understood that, at the end of any multiply cycle during which the multiply key 104 has been released, the link 124, (through its pin 169 and the bell crank 171), has moved the latch 183A, positively, to ineffective position and it will also be seen that the latch 183 is held ineffective by the square lamination 181 and that the pawl 201 has been released and is in its upright position shown in Fig. 17. The stub key 108, as was just explained, is still held down and this operates the machine for one more cycle before being released. During this extra cycle, the cam 187, on its forward stroke, hits the round boss 204 on the pawl 201 and carries the pawl 201 counter-clockwise until the point of the cam 187 passes over the boss 204 at which time the pawl 201 again snaps to its upright position. The cam 187 continues its forward stroke and, striking pin 179 on lever 174, releases the latch 183. On its return stroke, the cam 187 hits the boss 204 on pawl 201 and, as was previously described, turns the pawl 201 and plate 197 clockwise with the shaft 196 (Fig. 17). The turning of the shaft 196 causes the machine to back space as will now be described and it is to be noted that printing occurs at the end of the forward stroke in stub key cycles only.

Referring particularly to Figs. 9 and 10, it will be seen that the back space shaft 196 carries, near its middle, a gear segment 206 which constantly meshes with a gear 207 on the rear end of a shaft 208 which may be supported by the base plate X in any suitable manner. To the front end of shaft 208 is screwed fast a lever 209 which pivots and supports, at its upper end, a plate like pawl 210 which has a tooth 211 on its lower right hand edge and a rearwardly protruding pin 212 on its left hand side. Anchored to the pin 212 is a spring 213 which tends to constantly revolve the pawl 210 clockwise as seen in Fig. 10. The spring 213, at all times, holds the pin 212 against the eccentrically formed bottom 214 of a plate 215 which is fastened by screws 216 to the bent over ears 217 of a plate 218 which is screwed fast to the upper keyboard plate of the machine. A rack 219 is screwed to the movable pin carriage of the machine and this rack carries, on its upper edge, a set of teeth which are adapted to receive the tooth 211 on the plate like pawl 210. From the center of the rack 219 there protrudes, toward the front of the machine, the regular correction key 220 which is shown in full in Fig. 22 and by which the stop carriage may be moved toward the right (Fig. 10) until it reaches its limit, as is old and well known. In an automatic back spacing operation, the cam 187 (Fig. 17), on its return stroke swings the plate 197 clockwise and thus turns the shaft 196 in the same direction. This, through the gearing 206—207 (Fig. 9) turns the shaft 208 clockwise as seen in Fig. 10 and moves the plate-like pawl 210 toward the right of the machine in such a manner that the tooth 211, thereof, engages in the teeth of the rack 219 and moves the rack 219 and the movable stop carriage, to which it is fixed, one tooth space to the right. At this time the nose of the pawl 210 contacts and is stopped by a lug 221 which is screwed to the lower edge of the fixed plate 215. The arrangement just described also prevents the stop carriage from overthrowing. A spring 222 returns the pawl 210 to its normal leftward position which is shown in Fig. 10. By looking at Fig. 22, it will be seen that, in addition to the regular correction key 220, there is a back space key 223 which is used to back space the carriage one step at a time. As will be seen from Figs. 9 and 10, the back space key, a section of which is shown here, is frictionally held by a retainer 224 to a plate 225 which is mounted for lateral sliding movement, by pin and slot connections 226, upon the front of the fixed plate 215. The plate 225 is formed with two downwardly projecting fingers 227 and 230 upon its lower edge and a rightwardly projecting finger 232 on its top edge. The finger 227 which projects downwardly from the right hand end of the plate 225 holds one end of a spring 228 which is anchored at its opposite end to a pin 229, carried on the plate 215, and this spring tends constantly to draw the plate 225 toward its leftward limit. The downwardly projecting finger 230, which is at the left hand end of the plate 225 lies adjacent a roller 231 which is held between the lever 209 and the pawl 210. It will, therefore, be seen that, when the back space key 223 is moved toward the right of the machine, the finger 230 will carry the pawl 210 toward the right until it is stopped by the lug 221 and that the rightward movement of the movable pin carriage will be limited to one tooth space, as has been previously explained. At the same time that the plate 225 is moved by the manually operated back space key 223, the rightwardly extending finger 232, on the top of plate 225, will cam down a roller 233 which is carried by a lever 234 and which extends through a round hole cut in the fixed plate 215. The opposite end of the lever 234, is fastened to a rock shaft 235 and it will be seen that, when the finger 232 of plate 225 cams down the roller 233, the rock shaft 235 will be swung clockwise (as seen in Fig. 10) and this will swing, in the same direction, a lever 236 against the tension of its spring 237. The right hand end of this lever 236 overlies the forward end of a rock lever 238, Fig. 27, which is pivoted, at 239, to the right hand inner frame plate 103 and whose rearward end 240 lies in the same vertical plane as a lug 241 which is fast upon the right hand side of one of the main operating arms 242 of the machine. It will thus be evident that, when the stop carriage is manually back spaced, the shaft 235 and lever 236 will be rocked as described and will depress the forward end of the rock lever 238 so as to raise the rear end 240, thereof, into the path of the lug 241 and thus block movement of the main shaft 95. In view of the foregoing, it will be seen that, when the rear end 240 of lever 238 is raised, the machine cannot be operated and it will also be seen that, if the machine is operating, it will be impossible to manually back space the stop carriage but automatic back spacing will not lock the machine. The interlock between the backspace key 223 and the main shaft 95, which has just been described, cooperates with the old key interlock which is clearly shown in Figs. 12, 13 and 14 of the copending application Serial No. 73,020. In the present machine, as will be seen in Fig. 27, the universal bar 500, which is the equivalent of the universal bar 142 in Figs. 12, 13 and 14 of the copending application S. N. 73,020, is fast at its rear end to a rock arm 501 which overlies the front end of the lever 238. The lever 238 in the present machine is the equivalent of the lever 511 in Figs. 12, 13 and 14 of the above mentioned copending application, and it will thus be seen that, whenever a digit key 3 is depressed, the universal bar will be depressed and will lock the main shaft and it will also be seen that if the main shaft is operating the digit keys will be locked against depression. The interlock between the main shaft and digit keys is old in this machine and is described in pages 51 and 52 of the above copending application.

Fig. 21 shows part of the backspacing mechanism already described and it will be seen in both Figs. 9 and 21 that, near the right hand end of the shaft 196, there is an arm 244 which is made fast to shaft 196 by a screw retaining collar 245. The arm 244 carries, at its end, a stud or roll 246 which is adapted to move an arm 247, fast upon the left hand end of a rock shaft 248, suitably supported from the base by a bushing formed integral therewith, which carries, fast upon its right hand end, a lever 249 whose forward end underlies a pin 250 which is spring-pressed downward. The top of the pin 250 is adapted to contact the lower edge of the carriage return link 251, which is old and well known, and it will thus be seen that, whenever backspacing occurs, the arm 244 will cam the arm 247 counter-clockwise as seen in Fig. 21, and, through shaft 248 and arm 249, will raise the pin 250 which will, in turn, raise the carriage return link 251 and disable the carriage return means. This prevents the possibility of damage occurring to the carriage return link if the regular repeat key should accidentally become unlatched during an automatic backspace operation.

There remains only one point to be described in connection with multiplication and that is the case where a cypher appears in the multiplier. For example, if it were desired to multiply any number, such as 125, by 307, the multiply key would be held depressed intil a "3" showed on the dial and would then be released. The stub key would keep the machine running for one extra cycle, as has been previously described, and a "3" would be printed upon the paper tape as the first digit of the multiplier. If the multiply key were now held depressed for just one cycle, the stub key would run the machine for one more cycle and print a 1 as the second digit of the multiplier and "1250" would be added into the accumulator. Therefore, when a cypher appears in the multiplier, the machine must be manually backspaced and the platen should be turned one space ahead so as to leave a blank space on the paper tape where the cypher should be printed. Thus, in the above problem, 125×307, the printed tape would appear as follows:

```
    3         12500
       blank space
    7          125
              38375
```

Summary of multiplication

In summarizing the movements of the machine parts in executing the problem 125×375, Fig. 5 shows all parts in normal, unoperated position. Here the multiplier and quotient dial 145 shows a star and the rack 142 is disengaged from its detent 177 and is in its lowest position. The latch 183 is engaged over the square lamination 203 of the pawl 201 and the latch 183A is in its ineffective position. As was previously explained, the multiplicand 125 is set up on the keyboard and, since there are three digits in the multiplier, two cyphers are added. The regular repeat key is now latched down to disable the stop carriage return link 251, shown only in Fig. 21, and the multiply key 104 is depressed. The parts immediately assume the positions shown in Fig. 17. The multiplier and quotient type rack 142 has been raised one space, by the pin 140 in the arm 139, to show a zero on the dial 145; the latch 183 has released the pawl 201 which now stands upright; the latch 183A has been moved to a position where it is ready to act upon the pawl 201 when cam 187 swings it counter-clockwise; the non-print block arm 127 has been positioned in the path of the hammer restoring bail 130; the three armed bell-crank 121 has been swung clockwise and the ear 133 on its forward arm 131 has depressed the latch 134 and its associated arm 152 to set the non-add mechanism; and the multiply key 104 has been depressed and has depressed the stub key 108 which, in turn, has moved the two armed lever 146 counter-clockwise to start the motor. As the heart-shaped cam 187 moves clockwise, on its forward stroke, it first contacts the round lamination 204 on the pawl 201 and carries the pawl counter-clockwise until it is latched by the latch 183A, where it remains until a printing cycle. The cam 187 (Fig. 17) continues on its forward stroke, contacts the pin 179, and moves it rearwardly in the machine until it contacts the tail piece 178 of bell crank 173 and releases the detent 177 which immediately snaps into the teeth of the rack 142. By this time, the rack raising mechanism has assumed the position shown in Fig. 15 and is ready to, at the end of the return stroke, elevate the rack 142 one tooth space to show a "1" upon the dial 145. On the return stroke the cam 187 will first release the pin 179 and then continue idly back to normal position. At the end of this first multiply cycle, the bell crank lever 149 will move counter-clockwise, as seen in Fig. 17, and trip the latch 134 to release the bail-shaped bell crank 151 which will then move clockwise to its normal position where it will remain until the multiply key 104 is released and again depressed. The return of the bell crank 151 to normal position will release the non-add mechanism and, hence, the following three cycles will be add cycles. However, since the key 104 is still depressed, the two armed lever 146 will remain in its Fig. 17 position and will continue to run the motor.

The bent-over ear 148 is for the purpose of holding the lever 147 in a partially depressed position until the end of any cycle wherein the multiply key 104 has been prematurely released. For example, if the operator were multiplying by the digit "1," he might hit the key 104 and release it before the middle of that cycle. Thus, when the middle of said cycle occurred, the stub key 108 would be unlatched by the bail arm 120 (Fig. 13) and, if the ear 148 were not there, the arm 147, under spring tension, would raise the stub key 108 and stop the machine at the end of the first cycle. Two cycles, however, are necessary to print the "1." Thus, the arm 147 is held depressed by lug 148 to allow the stub key 108 to be relatched in the middle of the first cycle. At the end of this cycle, the ear 148 releases the arm 147 and the arm springs up to the position shown in Fig. 25 where it is held by the latched stub key 108. The stub key 108 then holds the arm 147 until the middle of the second cycle and at this time both 108 and 147 are released by the bail arm 120 to allow the machine to stop.

The second multiply cycle now begins and the heart shaped cam 187 passes idly by the pawl 201, which is now held cocked by the latch 183A, and moves the pin 179 and the lever 173 as previously explained. This, however, is really an idle movement because, on the previous cycle, the detent 177 was released to engage the multiplier and quotient rack and the pin 176 now lies under the rear nose 175A of the hook 175 and, consequently the cam 178 raises the nose slightly and then allows it to return to rest on top of the pin 176 and the pin 176 will retain the nose 175A on its top side until a printing cycle swings the entire detent 177 counter-clockwise as was previously described. At the end of this cycle, the rack 142 is ratcheted upward one tooth space to show a "2" on the dial 145. This second cycle is an add, non-print, non-line space cycle.

The third cycle is the same as the second and, at the end of this cycle, a "3" shows upon the dial. The operator now lifts his finger from the multiply key 104 and the stub key operates the machine for one extra cycle. When the multiply key 104 was released, the three-armed bell crank 121 immediately returned to normal, under tension of the spring 205 attached to the stud 168, and, consequently, the link 124 moved rearward in the machine. This removed the block arm 127 from the path of the hammer restoring bail 130, moved the bell crank 171 counter-clockwise which released the pawl 201 so that it stood upright as shown in Fig. 17, and moved the pin 168 away from latch 183 so that the only thing that held latch 183 in ineffective position was the lamination 181 which engaged the tail 182.

The fourth or stub key cycle now begins and, on the forward stroke, the cam 187 engages the round lamination 204 on the pawl 201 and swings the pawl counter-clockwise about its pivot 200 but, as both latches 183 and 183A are now in ineffective position, nothing holds it and, when the cam 187 passes, it again springs to its upright position. Cam 187 continues its forward stroke and hits the pin 179, as usual, raising the hook 175. At this time, the detent restoring mechanism, described in connection with Fig. 13, pulls the detent 177 counter-clockwise, as seen in Fig. 17, and, as cam 178 starts its return stroke, the hook 175 comes down over the pin 176 and retains it. At the same time, the multiplier and quotient rack 142 drops to its lowest position and a star shows on the dial 145. The cam 187 continues its return stroke and contacts the round lamination 204 on pawl 201 and swings both the pawl and plate 197 clockwise, to back space the stop carriage. At the end of the forward stroke of this last cycle the stub key 108 was released and this, in turn, released the two armed lever 146 to allow the motor to stop at the end of the cycle in the usual, well known manner. Thus, at the end of the stub key cycle, all parts have been returned to Fig. 5 position except the pawl 201 which is still upright and this will be latched down, as explained, by the latch 183A at the beginning of the next cycle of operation if that cycle is either a multiply or a divide cycle. If, however, it were any other cycle, then the latch 183 would remain in its normal position and latch the pawl 201 to position each and every part as shown in Fig. 5.

The process, given above, for multiplying by the 3, is repeated for the 7 and 5, the machine automatically back spacing at the end of each stub key cycle. The repeat key is now unlatched, the pin carriage is manually returned to its normal position, and the motor bar is operated twice to give the total, held in the accumulators, which is 46,875.

*Division*

Division is accomplished in the present machine by the well known method of first entering the dividend positively into the machine and then subtracting out the divisor. Any remainder which may have been left in the machine, after the above has been accomplished, is cleared and printed upon the tape by totaling the machine in the regular manner. In division, after the division lever has been tripped, the machine runs continuously and automatically back spaces until the entire problem has been worked out at which time it automatically stops. The operator manually clears the stop carriage, then totals the machine and the remainder, if any, is printed.

A sample printing of the problem 46,879÷125 appears upon the tape as follows:

*Actual printing*

```
    4 6 8 7 9
3   1 2 5 0 0
7     1 2 5 0
5       1 2 5
          4
```

The actual machine operations are as follows:

|   |                         |           |
|---|-------------------------|-----------|
|   | A & P                   | 4 6 8 7 9 |
|   | S & N.P.                | 1 2 5 0 0— |
|   | S & N.P.                | 1 2 5 0 0— |
|   | S & N.P.                | 1 2 5 0 0— |
|   | S & N.P. Carry over     | 1 2 5 0 0— |
| 3 | A & P Add back and back space | 1 2 5 0 0 |
|   | S & N.P.                | 1 2 5 0— |
|   | S & N.P.                | 1 2 5 0— |
|   | S & N.P.                | 1 2 5 0— |
|   | S & N.P.                | 1 2 5 0— |
|   | S & N.P.                | 1 2 5 0— |
|   | S & N.P.                | 1 2 5 0— |
|   | S & N.P.                | 1 2 5 0— |
|   | S & N.P. Carry over     | 1 2 5 0— |
| 7 | A & P Add back and back space | 1 2 5 0 |
|   | S & N.P.                | 1 2 5— |
|   | S & N.P.                | 1 2 5— |
|   | S & N.P.                | 1 2 5— |
|   | S & N.P.                | 1 2 5— |
|   | S & N.P.                | 1 2 5— |
|   | S & N.P. Carry over     | 1 2 5— |
| 5 | A & P Add back and back space | 1 2 5 |
|   | Remainder               | 4 |

Referring particularly to Figs. 5, 17 and 26, Fig. 5 shows the parts in normal position and it will be seen that there is a division key 255 (here shown in the form of a lever) which, when tripped, causes the machine to operate to subtract out the divisor. The division lever 255 is formed with a step 256, on the rear side of the handle portion, and a rearwardly extending ear 257 which normally engages over a leftwardly bent off ear 258 of a division stop key or lever 259 which is spring pressed counter-clockwise, in Fig. 5, by a spring 260, anchored at one end to a rearwardly extending arm 261 of the division stop lever 259. The lever 259 is clearly shown in detail in Fig. 20. Referring now to Fig. 26, wherein the parts are shown in isometric, it will be seen that a lever 262, which lies adjacent and to the left of the division lever 255, is freely mounted upon the reduced portion of a hub 263. A screw 264 runs through the hub 263 and the division lever 255 and is screwed into the left hand outer frame plate 100. Thus, the lever 255 is pivoted upon the shank of the screw 264 and is free to be rocked thereon. The lever 262 has an upright finger 265 which carries, upon its forward face, a step 266 adapted to, at certain times, engage and hold in elevated position the rightwardly bent off ear 267 of a lever 268. The step 266, on the upright finger 265 of the lever 262, is made so that it stands a little above the step 256 on the division lever 255 as is shown in Fig. 5. The bent over ear 267, on the lever 268, normally rests on top of the step 256 on the division lever 255. Returning to Fig. 26, it will be seen that a shaft 269, which is the subtraction shaft of the machine, carries fast upon its right hand end, a lever 270 whose forwardly extending toe 271 is adapted to be held latched as shown by a latch 272, which is urged counter-clockwise as shown in Fig. 26 by a spring 273, anchored at its forward end, to a rearwardly extending arm 274 of latch 272 and at its rear end to the machine frame, whenever the shaft 269 is swung clockwise (Fig. 26) from normal. The latch 272 only releases the lever 270 when there is a carry over from the accumulator wheel of highest order as will be explained in detail hereinafter. Fast upon the extreme left hand end of the shaft 269 is mounted a lever 275 which carries, upon its rear end, a rightwardly extending roller 276 which constantly engages the link 124 (Figs. 5 and 26) and which, when the division lever 255 is tripped, cams the link 124 toward the front of the machine. The lever 275 carries, at its forward end, a cam face 277 which is adapted, when the division lever is tripped, to act upon the pin 109 and depress the stub key 108. The lever 275 also carries a rightwardly bent under step 277A upon which rests the bottom of the lever 268. The lever 268 is loosely mounted upon the subtraction shaft 269 and is constantly urged clockwise, as seen in Figs. 5 and 26, by a very strong spring 278 which is anchored at its forward end to lever 268 and at its rear end to a pin or stud 279 which is held by the left hand outer frame plate 100. The division lever 255 has, at its bottom, a leftwardly bent off ear 280 which carries the rear end of a spring 281 whose forward end is anchored to the stud 106. Lever 255 also carries, upon its left hand side, a spring stud 282 upon which is anchored the lower end of a spring 283 whose upper end is anchored upon a spring stud 284 carried upon the left hand face of the lever 262. The spring 283 normally is but slightly tensioned but, when the division lever 255 is tripped, the tension of the spring 283 becomes great enough to draw the lever 262 against the rear side of the bent over ear 267 of lever 268 as is clearly shown in Fig. 26. The manual machine stop lever for division 259, as will be seen from Figs. 5 and 24, has, cut in its center, a slightly oblong hole and is freely mounted, thereby, upon a reduced portion of a hub 285 (Fig. 26). The right hand side of this lever 259 lies flat against the left hand outer frame plate 100 and is thus held against lateral movement.

Figure 18:
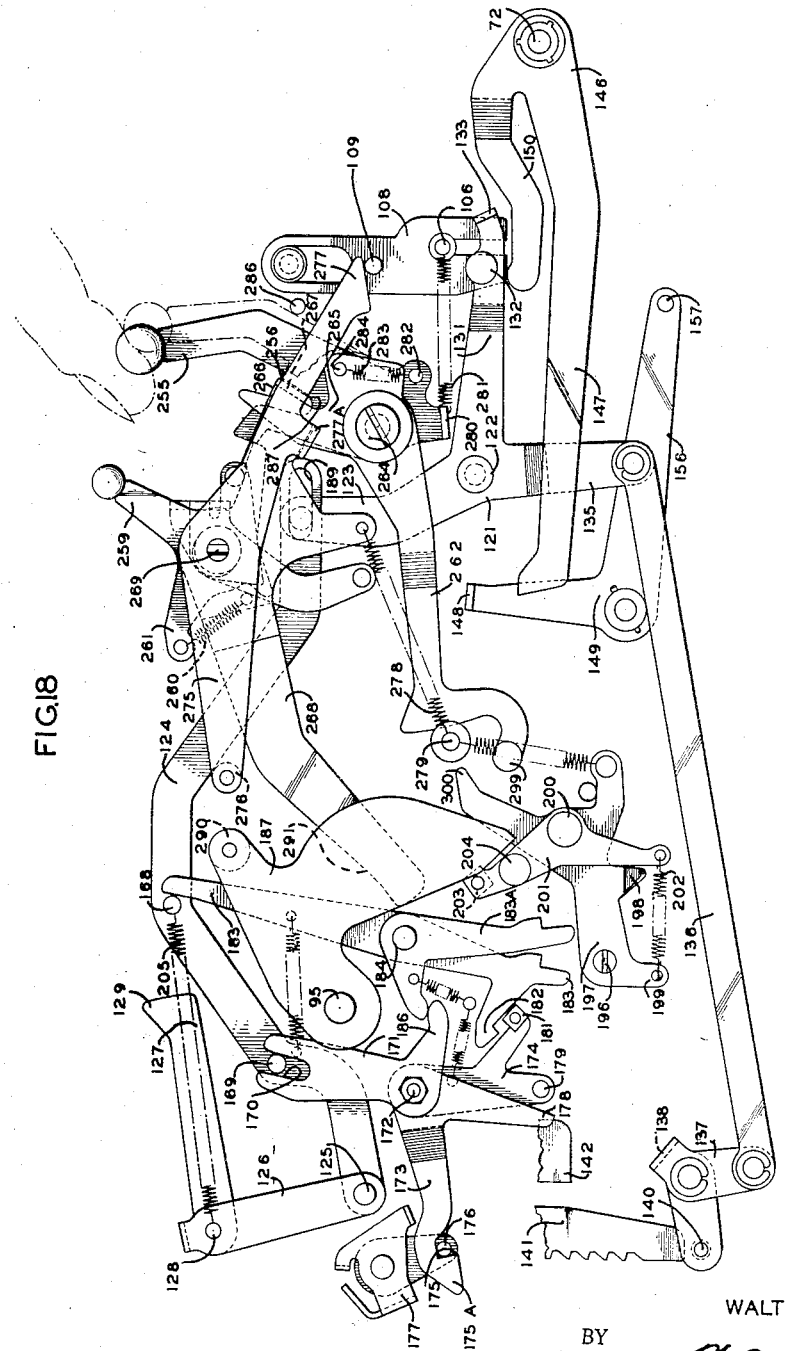
Fig. 18 is a left hand elevation similar to Fig. 17 but with the multiply key omitted and showing the division lever and manual machine stop lever and showing such parts as cooperate with the division lever on the left hand side of the machine.

Referring simultaneously to Figs. 18, 24 and 26, when the division lever 255 is tripped or pulled toward the front of the machine it moves from its normal Fig. 5 position to a position shown in dot dash lines in Fig. 18, where its forward or clockwise motion is limited by a pin 286, and then, when the finger pressure is gone, moves to the position shown in full lines in Figs. 18 and 26. At the same time, the stop lever 259 swings a slight distance counter-clockwise and positions its ear 258 directly behind ear 257 of division lever 255. The division lever must, therefore, remain in its Fig. 18 position until the stop lever 259 is either manually or automatically returned to normal.

In the problem 46879÷125, the dividend 46879 is added into the accumulator. The divisor 125 is now set up on the keyboard, two cyphers are added to make the number of digits in the dividend and divisor equal and the repeat key is latched down. The division lever 255 is now tripped and is locked in its forward or active position by the stop lever 259 and the machine then divides out the entire problem and automatically stops.

When the division lever 255 is tripped, as has just been explained, the ear 267 of lever 268 (as will be seen in Figs. 18 and 26) slips down into a hollow portion 287, formed in the division lever 255, and the lower surface of the lever 268, pressing against the rightwardly bent off step 277A of the lever 275, swings the lever 275 clockwise with it so that the lever 270, on the right hand end of the subtraction shaft 269, is swung clockwise as seen in Fig. 26 until it is latched by the latch 272. This, automatically, sets the machine for subtraction. As will be seen in Fig. 19, the rearwardly extending end of lever 270 underlies a pin 288 which is fast in the rearwardly extending portion 77 of the subtract key lever 20A and it will, thus, be evident that, when the division lever is tripped and the subtraction shaft 269 is rotated clockwise, as seen in Fig. 26, by the lever 275, the lever 270 on the right hand end thereof, will raise the pin 288 (Fig. 19) and move the loosely mounted subtract key 20A counter-clockwise about the subtraction shaft 269 (as seen in Fig. 19) to set the machine for subtraction.

Returning to Figs. 18 and 26, it will be seen that, at the same time that lever 275 swings the subtraction shaft, the forward end 277, thereof, through the pin 109, depresses the stub key 108 which, in turn, depresses the arm 150 of lever 146 and starts the motor. It will also be seen that the roller 276, on the rear end of lever 275, will cam the link 124 toward the front of the machine which will set the latches 183, 183A, etc., and the non-print mechanism. However, as will be clearly seen in Fig. 18, the link 124 is formed with an elongated slot 189 at its forward end and, therefore, when the link 124 is moved forwardly by roller 276, it does not operate the three armed bell crank 121 and, consequently does not set the non-add mechanism or raise the multiplier and quotient rack 142 to zero position. The machine begins to operate and, near the end of the first forward stroke, a roller 290, carried on the right hand face of the heart shaped cam 187, contacts the top rear edge 291 of the lever 268 and cams the lever counter-clockwise, as shown in Fig. 24, so that the ear 267 comes above the step 266 on the upright finger 265 of the lever 262. In the first part of the return stroke, the roller 290 releases the lever 268 and the ear 267, thereof, then comes to rest upon the step 266 of lever 262 which is swung into position to receive the ear 267 by the spring 283 which, as was previously described, was tensioned by the tripping of division lever 255. The lever 268 remains cocked atop the step 266 until a back space cycle occurs as will later be described in detail. The machine continues to run until the register is oversubtracted, which will occur in the fourth division cycle in the present problem, at which time the register wheel of highest order will effect a carry over and will trip the special transfer pawl 292 (shown in Figs. 14 and 15) which is located to the left of the highest order accumulator wheel and which is the equivalent of the pawl numbered 1960 in Fig. 8 of the drawings of Patent 2,203,336. The only difference between the pawl 1960, just mentioned, and the present pawl 292 is that pawl 292 is formed with a cam edged tail 293 which cooperates with a special slide 294. When a carry-over occurs, the special slide 294, which is the equivalent of the special slide 2110 shown in Fig. 9 of Patent 2,203,336, moves one step toward the front of the machine, in the usual manner. Returning to Figs. 14 and 15, it will be seen that the front end of slide 294 has a slot 295 cut therein which holds one end of a lever 296. As will be seen by examining Figs. 9, 14 and 15 together, the lever 296 is pivoted to the base plate X at 297. At its right hand end, as will be seen in Fig. 19, the lever 296 is pivoted to the forward end of a twisted link 298 whose rear end is pivotally attached to the lower arm of the latch 272. It will, therefore, be obvious that, when the register is overrun in a division problem, the latch 272 will be swung counter-clockwise as viewed in Fig. 19 to release the lever 270 which releases the subtraction key lever 20A so that the machine will add on the next cycle as is fully set forth in Patent 2,203,336. When the register is overrun, and this will be on the return stroke in the fourth operating cycle in the present problem, the release of the lever 270 (see Fig. 26) will allow the lever 275 to be moved so that it will release the stub key 108. However, since the lever 275 moves away from the stub key near the end of the fourth cycle, the stub key will remain latched down by the latching means, previously described in connection with Fig. 13 and the machine will continue to operate for another cycle. It will be understood that, at this time, the ear 267 of the lever 268 is seated atop the step 266 and that the link 124 (Fig. 26), which was released when lever 270 released lever 275, has returned to normal and cammed the lever 275 to normal. This brings the (Fig. 17) latch 183A to a position where it no longer holds the back space pawl 201 and leaves the latch 183 held in ineffective position by the square lamination 181. Therefore, the machine is, at the end of the fourth cycle, conditioned for printing and back spacing which occurs in the next or fifth cycle. The stub key is released in the middle of the fifth cycle and springs up to normal position and, since this cycle is an add cycle, the amount 12500, which was oversubtracted in the fourth cycle, is added back in. Ordinarily the machine would stop at the end of this cycle but, as will be seen in Figs. 18 and 26, the division lever is still in its forward or active position. Consequently, its spring 283 is still tensioned and is holding the lever 262, which carries a round lamination 299 on its tail, in its active position wherein its tail and the lamination 299 are slightly raised from normal and, when back spacing occurs, a nose 300, on the back space plate 197, moves clockwise (Fig. 18) and strikes the lamination 299. This swings the lever 262 slightly counter-clockwise and moves the step 266 away from the ear 267 which immediately snaps down into the notch 287 and carries with it the lever 275 in a manner previously explained. Thus, at the end of the fifth cycle, the lever 275 has again been moved to its active position and has again set the machine for subtraction and its nose 277 has again depressed the stub key 108 which causes the machine to continue to operate as previously described.

It will be remembered that, since the three-armed bell crank 121, Fig. 18, was not moved during division, the multiplier and quotient rack 142 was not raised by the pin 140 and, therefore, was raised by the pawl 165 (Fig. 14) to show a cypher on the dial 145 at the end of the first division cycle. Consequently, a "3" showed at the end of the fourth cycle and, since printing occurred in the middle of the fifth cycle, a "3" was printed on the tape as the first digit of the quotient. The type rack was not raised to "4" position until the end of the fifth cycle and it was then released and allowed to drop to normal in the identical manner described in connection with multiplication.

The second phase of division now begins and is an exact replica of the first phase except that "7 1250" is printed. During the second phase of division, the number "1250" is subtracted, until the register is overrun, instead of "12500" due to the back space at the end of the first phase or at the end of the fifth cycle.

At the end of the second phase or at the end of the fourteenth division cycle, the machine back spaces automatically and continues running into the third or last division phase. At the end of this third phase (or the twenty-first division cycle) the machine prints "5 125" and automatically stops. The pin carriage is manually cleared, a total is then taken and the remainder "4" is printed.

The mechanism for automatically stopping the machine is shown in Figs. 9, 18 and 20 wherein it will be seen that a bail bar 301, loosely mounted upon the subtraction shaft 269, holds at its right-hand end, a depending arm 302 which holds, at its lower end, a leftwardly protruding pin 303 which normally abuts a finger 304 which is fast to the right hand side of the accumulator actuating rack of lowest order 305. At its left hand end, the bail 301 holds a forwardly extending arm 306 which carries, at its front end, a pin 307, clearly shown in Fig. 20, which overlies the forwardly extending arm of the stop lever 259 and limits, as seen in Fig. 18, the counter-clockwise rotation of the stop lever. A spring 308 (see Fig. 20) tends to constantly rotate the bail 301 clockwise. The stop lever 259 is limited in its counter-clockwise rotation by a pin 309, fast in the left hand outer frame plate 100. In view of the foregoing, it will be seen that the machine will continue to operate automatically until the lowest significant digit of the divisor reaches units order. In the present problem this happened at the beginning of the third phase when the machine began subtracting 125, "5" being the lowest significant digit of the divisor. When the lowest significant digit of the divisor reaches units order, the machine continues until the register is oversubtracted and then, as was previously described, adds back the amount which, in the present instance, is 125, and stops. When the rack 305 moves toward the rear of the machine during the forward stroke, in the beginning of the third phase, it releases the pin 303 (Fig. 20) which allows spring 308 to rock bail 301 and, through pin 307, moves the stop lever 259 clockwise. This clockwise movement of lever 259 is enough to allow the division lever 255 to snap back to its normal Fig. 5 position where its ear 257 overlies the ear 258 on the stop lever 259. All this takes place on the forward stroke of the division cycle following the printing of the quotient digit "7." In the last division cycle, after the subtraction mechanism has been released and the lever 275 no longer holds the stub key, (said stub key being now held by the latch-arm 120, Fig. 13), the nose 300 (Fig. 18) on the back space place 197 swings clockwise and strikes the round lamination 299 which restores lever 262 to normal and allows the nose 267 of lever 268 (which was cocked on top of the step 266) to drop down onto the step 256 of division lever 255, which was restored to normal in the first part of the cycle. Thus all parts have been restored to normal except the pin carriage and it is now restored manually. The repeat key is then released and the machine is totaled. This totaling also prints any remainder left in the machine.

The means for locating the decimal point upon the printed tape is shown in Figs. 11 and 12 wherein the problem 46879÷125 has been carried out to the full capacity of the machine which is nine digits. Thus 468790000 was added in and 125000000 was set up as the divisor. Fast upon the face of the paper knife but spaced slightly forward therefrom is mounted a flat strip 310 which carries a slidable pointer or index member 311 having a shaded point 312. Integral with the left hand side of strip 310 is a fixed pointer or index member 313 which is the pointer that actually denotes the position of the decimal point. After the division is finished, the tape is rolled back so that the point 312 is on a line with the printed dividend and the pointer 311 is then moved until the point 312 rests just to the right of the lowest digit of the dividend as shown in Fig. 12. The paper tape is then advanced until the point 312 is positioned on a line with and just to the right of the lowest digit of the divisor which, in the present example, is 5. At this point the pointer 313 shows the correct decimal point location in the quotient as is shown in Fig. 11.

Errors made in setting up division problems are shown to the operator before completion of the problems by the multiplier and quotient rack printing a star. If, for example, in the problem 46879÷125, the highest digit of the divisor or the "1" were positioned beneath the second highest (instead of the highest) digit of the dividend, in the first division phase, the divisor would go more than nine times into the dividend. In Figs. 9, 14, and 15, it will be seen that the type rack 142 carries, on its left hand side, a flat strip 320. The special slide 294 is formed with a shoulder 321, adapted at certain times to cooperate with a cross bar 321A, on its lower edge and a broadened tail 322 which cooperates with the strip 320 to hold the slide 294 in its normal forward position when the accumulator rack restoring bail 323 moves rearward which it does, in the well known manner, during each forward stroke of the machine's main shaft 95. When the rack 142 is moved upward more than nine times, the strip 320, thereon, no longer retains the tail 322 of the special slide 294 and, consequently, the slide 294 moves rearward, in the eleventh cycle, and a lug 324 thereon cams down the transfer pawl 292. Hence, on the return stroke of the cycle in which this occurs, the slide 294 will move an extra step toward the front of the machine and, through the lever 296 as has been previously explained, release the subtraction mechanism. The next cycle will be a print and back space cycle and a star will be printed by the rack 142, showing a mistake. The operator then pulls the finger piece on the machine stop 259 (Fig. 9) toward the front of the machine to stop it as was shown automatically done in regular division. If, however, the operator does not see the mistake and does not touch the manual machine stop 259, the machine will continue to run as in regular division until the lowest significant digit of the divisor reaches units column and a star will be printed once for every twelve machine cycles.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. In a machine of the class described, the combination with main operating mechanism including an operating shaft, of a register, actuating mechanism for said register; a stop carriage, movable from a normal inactive position to a plurality of active positions, for controlling said register actuating mechanism; means, operable from said operating shaft, for returning said movable stop carriage from any of its active positions to its normal position; means, operable from said operating shaft, for backspacing said movable stop carriage; and means operable by said backspacing means for disabling the carriage return means.

2. In a calculating machine whereon problems in division may be executed, the combination with main operating mechanism for said machine of a register, settable for addition and for subtraction, actuating mechanism for said register, a movable stop carriage for controlling the register actuating mechanism, means operable by said main operating mechanism for setting said register for addition and for subtraction, a division key, means operable by said division key for causing the register-setting mechanism to set said register for subtraction, means operable by the wheel of highest order of said register for automatically conditioning the register-setting mechanism to set said register for addition when the same is over-subtracted in a division operation of the machine, mechanism operable by said main operating mechanism for backspacing said movable stop carriage in such operation of the machine, and means operable by said backspacing mechanism for conditioning the register-setting mechanism to reset said register for subtraction in such operation of the machine after said wheel of highest order has conditioned the register-setting mechanism to set said register for addition.

3. In a machine of the class described, the combination with main operating mechanism of a multiplier key, a rack, means operable by said key for imparting a single increment of movement to said rack, means for securing said rack in all positions to which it may be moved, means operable by said main operating mechanism for imparting one step of movement to said rack, in the same direction of movement as that imparted to it by said key operable means, during each cycle of multiplying operation of said machine, means under control of said key for disabling said securing means, and a visible indicator dial operable by said rack for indicating to the operator of the machine the number of multiplying cycles performed.

4. In a machine of the class described upon which problems in multiplication may be performed, the combination with main operating mechanism for said machine, of a carriage, means operable by said main operating mechanism for back-spacing said carriage, a pair of latches for controlling said back-spacing means one of which latches normally rests in an active position for disabling said back-spacing means and the other of which normally rests in an inactive position, a key through means of which multiplying operations of the machine are effected, means operable by said key for rendering said normally active latch ineffective and concomitantly rendering the other latch effective, means for retaining the first mentioned latch in ineffective position, and means operable by said main operating mechanism for disabling said latch-retaining means at every cycle of multiplying operation of said machine.

5. A device for locating decimal point positions on printed records of division problems which records are printed with the digits of the quotient arranged one under another and a respective divisor opposite each quotient digit, said device including an index member movable to various positions with relation to the printed divisors, and a second index member adapted to traverse the digits of the quotient and cooperative with the first index member for indicating the location of the decimal point in the quotient.

6. In a machine of the class described, the combination with main operating mechanism of a settable control device for regulating machine functions, a division key, means controlled by said key for setting said control device, means operable by said main operating mechanism for disabling said setting means, a latching device for holding said setting means disabled, means effective during operation in division of the machine for restoring said settable control device to initial position, and means operable by said main operating mechanism for disabling said latching device.

7. In a machine of the class described, the combination of an accumulator, a settable control device for regulating machine functions, a key, means controlled by said key for setting said control device, means for latching said control device in set position, means controlled by the highest order accumulator wheel for disabling said latching means, printing instrumentalities for said machine including a set of hammers and a hammer-restoring bail, and means affected by said control device upon disablement of said latching means to permit operation of the printing instrumentalities during operation of the machine, said last named means locking said hammer restoring bail to disable said hammers when the control device is in set position.

8. In a machine of the class described upon which problems in division may be performed, the combination of an accumulator, a settable control device for regulating machine functions, mechanism for setting said accumulator for addition and for subtraction, means operable by said control device for controlling said accumulator-setting means, a division key, means controlled by said key for setting said control device, means for latching said control device in set position, means controlled by the highest order accumulator wheel for disabling said latching means, printing instrumentalities for said machine including a set of hammers and a hammer-restoring bail, and means affected by said control device upon disablement of said latching means to permit operation of the printing instrumentalities of the machine, said last named means locking said hammer-restoring bail to disable said hammers when the control device is in set position.

9. In a calculating machine wherein problems in multiplication may be executed by repeated addition of the multiplicand into the register; the combination of a register; means for actuating said register; main operating mechanism for said machine; means operable by said main operating mechanism for engaging said register with its actuating means for addition; non-add mechanism operable to disable the register engaging means; a multiplier key; means operable by said multiplier key for giving the main operating means repeated cycles of operation; means operable by said key to render said non-add mechanism effective; and means controlled by said cycling means, after completion of the first cycle of operation of the main operating mechanism, for disabling said last mentioned means to render the non-add mechanism ineffective.

10. In a computing machine, the combination with main operating mechanism of a multiplier key, a movable special rack, means operable by said multiplier key for imparting an increment of movement to said rack to move the same to a predetermined position, means for latching said rack in any position to which it may be moved, means operable by said multiplier key for giving the main operating means repeated cycles of operation, means operable by said main operating mechanism for imparting one increment of further movement to said rack during each cycle of multiplying operation of the machine, and means under control of said multiplier key for disabling said latching means for said special rack to permit the same to return to a starting position.

11. In a machine of the class described upon which problems in division may be performed, the combination with main operating mechanism for said machine, means for giving the main operating means cycles of operation, a carriage, means operable by said main operating mechanism for backspacing said carriage, a pair of latches for controlling said backspacing means, one of which latches normally rests in an active position for disabling said backspacing means and the other of which normally rests in an inactive position, a lever by means of which division operations of the machine are effected, means operable by said lever for rendering said normally active latch ineffective and concomitantly rendering the other latch effective, means for retaining the first mentioned latch in ineffective position, and means operable by said main operating mechanism for disabling said latch retaining means at every cycle of operation of the main operating mechanism.

12. In a calculating machine wherein problems in division may be executed by first adding the dividend into the register and then repeatedly subtracting out the divisor in continuous and consecutive machine operations, the combination of a division key, means for latching said key in operative position, a settable control device for regulating machine functions, means controlled by said key for setting said control device, a register capable of being set for either addition or subtraction, register actuating devices, one for each wheel of the register, and means controlled by the lowest order register actuating device for disabling said key latching means.

WALTER W. LANDSIEDEL.